(12) United States Patent
Futa et al.

(10) Patent No.: US 7,664,260 B2
(45) Date of Patent: Feb. 16, 2010

(54) SIGNATURE GENERATION DEVICE, KEY GENERATION DEVICE, AND SIGNATURE GENERATION METHOD

(75) Inventors: Yuichi Futa, Osaka (JP); Shingo Hasegawa, Miyagi (JP); Shuji Isobe, Miyagi (JP); Motoji Ohmori, Osaka (JP); Hiroki Shizuya, Miyagi (JP)

(73) Assignee: Panasonic Corporation, Osaka (JP)

( * ) Notice: Subject to any disclaimer, the term of this patent is extended or adjusted under 35 U.S.C. 154(b) by 124 days.

(21) Appl. No.: 11/795,256

(22) PCT Filed: Jan. 17, 2006

(86) PCT No.: PCT/JP2006/000508

§ 371 (c)(1),
(2), (4) Date: Jul. 13, 2007

(87) PCT Pub. No.: WO2006/077820

PCT Pub. Date: Jul. 27, 2006

(65) Prior Publication Data

US 2008/0089514 A1    Apr. 17, 2008

(30) Foreign Application Priority Data

Jan. 24, 2005    (JP) .............................. 2005-015161

(51) Int. Cl.
*H04L 9/00* (2006.01)
*H04L 9/30* (2006.01)

(52) U.S. Cl. ........................... 380/30; 380/28; 713/170; 713/176; 713/180

(58) Field of Classification Search ..................... 380/30
See application file for complete search history.

(56) References Cited

U.S. PATENT DOCUMENTS

| 6,081,597 | A | 6/2000 | Hoffstein et al. |
| 7,308,097 | B2 * | 12/2007 | Hoffstein et al. .............. 380/28 |
| 2003/0120929 | A1 | 6/2003 | Hoffstein et al. |

FOREIGN PATENT DOCUMENTS

JP    2000-516733    12/2000

(Continued)

OTHER PUBLICATIONS

Hasegawa et al., "A Countermeasure for Protecting NTRUSign against the Transcript Attack", *Symposium on Cryptography and Information Security*, vol. II, pp. 943-947, Jan. 2005 (including English translation).

(Continued)

*Primary Examiner*—Ponnoreay Pich
(74) *Attorney, Agent, or Firm*—Wenderoth, Lind & Ponack, L.L.P.

(57) ABSTRACT

A signature generation apparatus preventing an transcript attack on signature data. The signature generation apparatus for generating signature data for message data (i) acquires, according to a predetermined acquisition method, a private key, which is different from a private key used in a previous digital signature operation, from among a plurality of private keys generated using a key generation method of a signature scheme in which the plurality of private keys correspond to a single public key, and (ii) performs, using the acquired private key, a digital signature operation on the message data according to a signature method of the signature scheme to generate the signature data.

14 Claims, 8 Drawing Sheets

FOREIGN PATENT DOCUMENTS

| | | |
|---|---|---|
| WO | 03/050998 | 6/2003 |
| WO | 2004-032413 | 4/2004 |

OTHER PUBLICATIONS

Dodis et al., "Strong Key-Insulated Signature Schemes", *Lecture Notes in Computer Science*, vol. 2567, pp. 130-144, 2003.

Bellare et al., "A Forward-Secure Digital Signature Scheme", *Lecture Notes in Computer Science*, vol. 1666, pp. 431-448, 1999.

Hoffstein et al., "NTRU: A Ring-Based Public Key Cryptosystem", *Lecture Notes in Computer Science*, vol. 1423, pp. 267-288, 1998.

Hoffstein et al., "NSS: An NTRU Lattice-Based Signature Scheme", *Eurocrypt*, vol. 2045, pp. 123-137, 2001.

Hoffstein et al., "NTRUSign: Digital Signatures Using the NTRU Lattice", *CT-RSA '03*, vol. 2612, pp. 122-140, 2003.

Hoffstein et al., "NTRUSign: Digital Signatures Using the NTRU Lattice Preliminary Draft 2", Apr. 2, 2002.

Supplementary European Search Report issued Nov. 6, 2008 in corresponding EP Application No. 06 71 1788.

* cited by examiner

SIGNATURE GENERATION DEVICE, KEY GENERATION DEVICE, AND SIGNATURE GENERATION METHOD

TECHNICAL FIELD

The present invention relates to encryption technology used for information security, in particular to digital signature technology.

BACKGROUND ART

Digital signature schemes that are a type of public-key encryption are technology used for identifying a sender and preventing data falsification when data is sent from a receiving apparatus to a transmitting apparatus. To explain the schemes simply, the transmitting apparatus creates signature data for data desired to be transmitted using a private key of the transmitting apparatus, and then transmits the signature data to the receiving apparatus together with the desired data. The receiving apparatus performs a verification of the signature data using a public key corresponding to the private key of the transmitting apparatus to judge whether the desired data has been falsified (see Non-Patent Reference 1, for example). Here, it is difficult to calculate a value of the private key from the public key.

Recently, the NTRU encryption is proposed as a public-key encryption enabling high-speed processing (e.g., Non-Patent Reference 2). The NTRU encryption performs encryption and decryption by polynomial operations that can be implemented at higher speeds, as compared to RSA encryption that carries out module exponentiation under a certain rule and an elliptic curve cryptosystem that performs scalar multiplication for points on an elliptic curve. Hence, the NTRU encryption achieves higher-speed processing than conventional public-key encryption, and is also capable of performing, when used in software processing, the processing in a practical period of time.

Accordingly, an encryption communication system using the NTRU encryption for the public-key encryption has an advantage that processes of the transmitting apparatus and receiving apparatus can be performed at higher speeds than an encryption communication system using conventional public-key encryption.

Although the proposed NTRU encryption scheme mentioned above is confidentiality encryption for encrypting data, later in time a digital signature scheme using the NTRU encryption has been proposed (see Non-Patent Reference 3). As to digital signature schemes, their schemes have been changed several times because of advent of cryptanalysis and the like. The following gives a brief description of a digital signature scheme called NTRUSign (for more details, see Patent Reference 2 and Non-Patent Reference 4).

In the key generation under the NTRUSign signature scheme, the private key and public key are generated by using multiple elements in a polynomial ring R with integer coefficients and an ideal of the ring R module a polynomial $X^N-1$. Here, "$X^a$" denotes X to the power of a. For generating a signature under the NTRUSign signature scheme for a message, the generated private key and a 2·N-dimensional vector, which is a hash value of the message, are used. For the signature verification of the NTRUSign signature scheme, the public key, the signature for the message, and the 2·N-dimensional vector are used. Since Non-Patent References 4 and 5 describe a ring and an ideal of the ring used in the NTRUSign signature scheme, their descriptions are left out here.

<NTRUSign Signature Scheme>

(1) Parameters of NTRUSign Signature Scheme

The NTRUSign signature scheme uses parameters of nonnegative integers, N, q, df, dg, and Normbound. The meanings of these parameters are described next.

(1-1) Parameter N

The NTRUSign signature scheme is a digital signature scheme that performs signature generation and verification using polynomial operations. The degree of a polynomial used in the NTRUSign signature scheme is determined by the parameter N.

Polynomials used in the NTRUSign signature scheme are polynomials of degree N−1 or less with integer coefficients for the above parameter N. A polynomial $X^4+X^3+1$ is an example in the case when N=5. Note that a (mod $X^N-1$) operation is performed on the polynomial so as to always calculate a polynomial of degree N−1 or less with integer coefficients. This is because, by performing the (mod $X^N-1$) operation, a relational expression $X^N=1$ is realized, and therefore a variable of degree N or more can always be converted into a variable of degree N−1 or less. Here, it can be understood that a polynomial with integer coefficients obtained by performing the (mod $X^N-1$) operation on a polynomial is an element in the polynomial ring R.

In addition, both a public key h and a signature s are expressed as polynomials of degree N−1 or less. Besides, the private key is a set of four polynomials of degree N−1 or less (f, g, F, G). Namely, f, g, F and G are all polynomials of degree N−1 or less and elements of the polynomial ring R. Note that the set of four (f, g, F, G) is further treated as a pair of two pairs (f, g) and (F, G) and hereinafter sometimes denoted as {(f, g), (F, G)}.

Then, the polynomial operation uses the relational expression $X^N=1$ for the parameter N to produce the result always being a polynomial of degree N−1 or less. For example, in the case where N=5, the product of a polynomial $X^4+X^2+1$ and a polynomial $X^3+X$ is always a polynomial of degree N−1 or less, as shown below, due to a relationship $X^5=1$:

$$(X^{\wedge}4 + X^{\wedge}2 + 1) \times (X^{\wedge}3 + X) = X^{\wedge}7 + 2 \cdot X^{\wedge}5 + 2 \cdot X^{\wedge}3 + X$$
$$= X^{\wedge}2 \cdot 1 + 2 \cdot 1 + 2 \cdot X^{\wedge}3 + X$$
$$= 2 \cdot X^{\wedge}3 + X^{\wedge}2 + X + 2$$

where × is the symbol for the multiplication of a polynomial by a polynomial, and # is the symbol for the multiplication of an integer by a polynomial (or an integer by an integer).

Note that, in the NTRUSign signature scheme, a polynomial of degree N−1, $a=a\_0+a\_1*X+a\_2*X^2+\ldots+a\_(N-1)*X^{(N-1)}$ is equated with a vector $(a\_0, a\_1, a\_2, \ldots a\_(N-1))$. $a\_0, a\_1, a\_2, \ldots,$ and $a\_(N-1)$, are coefficients of the polynomial a and integers.

(1-2) Parameter q

The NTRUSign signature scheme uses the parameter q which is an integer of 2 or more and an ideal of the polynomial ring R. Coefficients of polynomials in the NTRUSign signature scheme are remainders modulo q.

(1-3) Parameters df and dg

How to select a polynomial f, which is a part of the private key used in the NTRUSign signature scheme, and a polynomial g used with the polynomial f for generating a polynomial h, which is the public key, is determined by parameters df and dg, respectively.

The polynomial f is selected so that df pieces of coefficients are 1 and the remaining coefficients are 0. That is, the polynomial f is a polynomial of degree N−1 or less, and has N pieces of coefficients from degree 0 (constant term) to degree N−1. Here, the polynomial f must be selected so that, among the N pieces of the coefficients, df pieces of coefficients are 1 and (N−df) pieces of coefficients are 0.

Then, the polynomial g is selected so that dg pieces of coefficients are 1 and the remaining coefficients are 0.

(1-4) Parameter Normbound

In the NTRUSign signature scheme, a distance between a 2·N-dimensional vector created from the signature s and a 2·N-dimensional vector, which is a hash value of the message, to be hereinafter described is calculated, and the authenticity of the signature is judged based on the distance. The Normbound is a threshold used in the judgment. Namely, if the distance is less than the Normbound, the signature is accepted as an authentic signature, whereas if the distance is the same as the Normbound or more, it is denied as an inauthentic signature.

Non-Patent Reference 4 gives an example of parameters of the NTRUSign signature scheme: (N, q, df, dg, Normbound) =(251, 128, 73, 71, 310).

(2) Hash Value of Message and Distance Between Norm and Vector

The NTRUSign signature scheme creates a signature corresponding to a hash value of a message m. The hash value of the message m is a polynomial pair of degree N, (m1, m2), and is equated with a 2·N-dimensional vector. Non-Patent Reference 1 details the hash function that calculates a hash value from a message.

The NTRUSign signature scheme uses a distance of a vector for the signature verification. The following describes the definition.

A norm $\|a\|$ of the polynomial $a=a\_0+a\_1 \cdot X+a\_2 \cdot X^2+\ldots+a\_(N-1) \cdot X^{(N-1)}$ is defined as:

$$\|a\|=\text{sqrt}((a\_0-\mu)^2+(a\_1-\mu)^2+\ldots+(a\_(N-1)-\mu)^2),$$

$$\mu=(1/N) \cdot (a\_0+a\_1+a\_2+\ldots+a\_(N-1)),$$

where sqrt(x) is a square root of x.

The norm $\|(a, b)\|$ of the pair (a, b) of the polynomials a and b is defined as:

$$\|(a,b)\|=\text{sqrt}(\|a\|^2+\|b\|^2).$$

The distance between the pair (a, b) of the polynomials a and b and the pair (c, d) of the polynomials c and d is defined as $\|(c-a, d-b)\|$.

Herewith, a polynomial of degree N−1 or less with integer coefficients obtained by performing the (mod X^N−1) operation can be regarded as an N-dimensional array in which the addition, subtraction, multiplication and a norm indicating the size of an element are defined, and the polynomial ring R can be regarded as a set of N-dimensional arrays.

(3) Key Generation of NTRUSign Signature Scheme

The NTRUSign signature scheme randomly generates the polynomials f and g using the parameters df and dg, as mentioned above. Then, as Non-Patent Reference 4 describes, a polynomial Fq which satisfies Fq×f=1(mod q) is used in an equation, $$h=Fq \times g (\text{mod } q)$$

to thereby generate the polynomial h. Here, the polynomial Fq is referred to as an inverse element of the polynomial f.

Furthermore, the polynomials F and G are obtained, the norm of which is small enough to satisfy the following equation:

$$f \times G - g \times F = q.$$

The private key is denoted as {(f, g), (F, G)}, and the public key, as h. The private key is a key for generating a signature and also called a signature generation key. Additionally, the public key is a key for verifying the signature and also called a signature verification key.

Here, x=y(mod q) is an operation to assign, to a coefficient of degree i of a polynomial x, a reminder obtained when a coefficient of degree i of a polynomial y is divided by a modulus q in a manner that the remainder falls in the range from 0 to q−1 (0≦i≦N−1). That is, it is an operation where a mod-q operation is performed on a polynomial y so as to keep each coefficient of the polynomial y within the range of 0 and (q−1), to whereby obtain a polynomial, which is then assigned to the polynomial x.

(4) Signature Generation of NTRUSign Signature Scheme

In the signature generation under the NTRUSign signature scheme, the signature s of the message m, on which digital signature operation is performed, is calculated. First, the 2·N-dimensional vector (m1, m2) (m1 and m2 are polynomials of degree N), which is a hash value for the message m, is calculated.

The 2·N-dimensional vector (m1, m2) and private key {(f, g), (F, G)} are used to calculate the polynomials a, b, A and B satisfying the following equations:

$$G \times m1 - F \times m2 = A + q \times B; \text{ and}$$

$$-g \times m1 + f \times m2 = a + q \times b.$$

Here, coefficients of A and a are remainders obtained when G×m1−F×m2 is divided by the modulus q in a manner that the remainders fall in the range from <−q/2>+1 to <q/2>. That is, in the case where each remainder obtained by the division by the modulus q is between <q/2> and q−1, q is subtracted from the remainder so that the remainder is adjusted to fall in the above range. Here <x>denotes the largest number among numbers being x or less. For example, <−½>=−1.

Next, s and t are calculated using the following equations, and s is output as a signature:

$$s=f \times B + F \times b (\text{mod } q); \text{ and}$$

$$t=g \times B + G \times b (\text{mod } q).$$

(5) Signature Verification of NTRUSign Signature Scheme

In the signature verification under the NTRUSign signature scheme, it is verified whether the signature s is an authentic signature of the message m, on which digital signature operation is performed. First, the 2·N-dimensional vector (m1, m2), which is a hash value for the message m, is calculated.

The polynomial t is calculated with the following equation using the public key h:

$$t=s \times h (\text{mod } q).$$

The distance between the 2·N-dimensional vectors (s, t) and (m1, m2) is found, and the distance is then checked whether to be less than the Normbound. When it is less than the Normbound, the signature s is accepted, being determined as the authentic signature. On the other hand, if the distance is the same as the Normbound or more, it is denied, being determined as an inauthentic signature.

<Patent Reference 1> Published Japanese Translation of a PCT Application Originally Filed in English, No. 2000-516733.
<Patent Reference 2> WO2003/050998
<Non-Patent Reference 1> Tatsuaki Okamoto and Hiroshi Yamamoto, "Modern Cryptography", Sangyo Tosho (1997).

<Non-Patent Reference 2> J. Hoffstein, J. Pipher and J. H. Silverman, "NTRU: A Ring-Based Public Key Cryptosystem", Lecture Notes in Computer Science 1423, pp. 267-288, Springer-Verlag, (1998).

<Non-Patent Reference 3> J. Hoffstein, J. Pipher and J. Silverman, "NSS: An NTRU Lattice-Based Signature Scheme", Advances in Cryptology-Eurocrypt '01, LNCS, Vol. 2045, pp. 123-137, Springer-Verlag, (2001).

<Non-Patent Reference 4> J. Hoffstein, N. Graham, J. Pipher, J. Silverman and W. Whyte, "NTRUSign: Digital Signatures Using the NTRU Lattice", CT-RSA '03, LNCS, Vol. 2612, pp. 122-140, Springer-Verlag, (2003).

<Non-Patent Reference 5> J. Hoffstein, N. Graham, J. Pipher, J. H. Silverman and W. Whyte, "NTRUSign: Digital Signatures Using the NTRU Lattice Preliminary Draft 2—Apr. 2, 2002", <http://www.ntru.com/cryptolab/pdd/NTRUSign-preV2.pdf> (Accessed Jan. 20, 2005).

DISCLOSURE OF THE INVENTION

Problems that the Invention is to Solve

The above-mentioned NTRUSign signature scheme is subject to a type of attack called transcript attack. Transcript attack recovers the private key from multiple signed texts (pairs of a message and a signature). Since Non-Patent Reference 4 details transcript attack, only a brief description is given below.

Transcript attack takes advantage of that a difference, m1−s, between multiple signatures s and a part of the hash value (m1, m2) of the message becomes $$m1-s = e1 \times f + e2 \times F$$

where e1 and e2 are polynomials whose coefficients fall in the range of $-\frac{1}{2}$ and $\frac{1}{2}$, and finds part of the private key, f and F, by calculating the averages of the second and fourth moments of the difference m1−s. Here, the second moment $a\sim2$ of the polynomial a is the product $a\sim = a \times a^*$, where $a = a\_0 + a\_1 \cdot X + a\_2 \cdot X^2 + \ldots + a\_(N-2) \cdot X^{(N-2)} + a\_(N-1) \cdot X^{(N-1)}$ and a reciprocal polynomial of a, $a^* = a\_0 + a\_(N-1) \cdot X + a\_(N-2) \cdot X^2 + \ldots + a\_2 \cdot X^{(n-2)} + a\_1 \cdot X^{(N-1)}$. In addition, the fourth moment $a\sim4$ is $a\sim2$ to the power of 2, i.e. $a\sim4 = a\sim2 \times a\sim2$.

(the second moment of m1−s)=$(e1 \times f + e2 \times F) \times (e1^* \times f^* + e2^* \times F^*)$ $= e1 \sim \times f \sim + e2 \sim \times F \sim + e1 \times f \times e2^* \times F^* + e2 \times F \times e1^* \times f^*$ If the number of the signed texts is increased, then $e1\sim$ and $e2\sim$ included in the average of the second moment of m1−s converge to certain values k1 and k2, and $e1 \times f \times e2^* \times F^*$ and $e2 \times F \times e1^* \times f^*$ approximates 0. Accordingly, the number of the signed texts is large, the average of the second moments of m1−s is substantially equal to $k1 \times f \sim + k2 \times F \sim$. Furthermore, information related to f and F can be obtained from the average of the fourth moments in a similar fashion, and f can be found from the above-mentioned information. According to Non-Patent Reference 4, the numbers of signed texts required to obtain information related to the private key from the averages of the second moments and the fourth moments are $10^4$ and $10^8$, respectively. Hence, it is considered that $10^8$ signed texts or more are required in order to make the transcript attack on the NTRUSign signature scheme a success.

The present invention aims at offering a signature generation apparatus, a key generation apparatus, a signature system, a signature generation method, a signature generation program, a key generation method, a key generation program, an integrated circuit for signature generation, and an integrated circuit for key generation, all of which are capable of preventing transcript attack on signature data.

Means to Solve the Problem

In order to achieve the above object, the present invention is a signature generation apparatus for generating signature data for message data. The signature generation apparatus comprises: a private key acquisition unit operable to acquire, according to a predetermined acquisition method, a private key from among a plurality of private keys generated using a key generation method of a signature scheme in which the plurality of private keys correspond to a single public key, the acquired private key being different from a private key used in a previous digital signature operation; and a signature generation unit operable to perform, using the acquired private key, a digital signature operation on the message data according to a signature method of the signature scheme to generate the signature data.

Adantaeous Effects of the Invention

According to the structure above, the signature generation apparatus acquires, from among multiple private keys corresponding to a single public key, a private key that is different from one used in a previous digital signature operation. Herewith, even if an attacker obtains signature data and attempts transcript attack, he/she does not know the obtained signature data was generated using which one of the previously used private key and the private key used in this time's digital signature operation. Therefore, the signature generation apparatus is capable of preventing the transcript attack on signature data.

In this case, the predetermined acquisition method may be random acquisition of the private key, and the private key acquisition unit may randomly acquire the private key from among the plurality of private keys.

According to the structure above, the signature generation apparatus randomly acquires, from among multiple private keys, a private key that is different from one used in a previous digital signature operation. Therefore, even if an attacker obtains signature data and attempts the transcript attack, he/she does not know the obtained signature data was generated using which one of the private keys. Thus, the signature generation apparatus is capable of preventing transcript attack on signature data.

In this case, the private key acquisition unit may store therein the plurality of private keys.

According to the structure, the signature generation apparatus acquires the private key from among multiple private keys stored therein, and thus the acquisition of the private key corresponding to the public key is assured.

In this case, the signature scheme may be a lattice-based signature scheme. Here, the plurality of private keys stored in the private key acquisition unit are generated using the key generation method of the lattice-based signature scheme.

According to the structure, a lattice-based signature scheme for key generation and signature generation is capable of generating multiple private keys corresponding to a single public key due to the nature of the lattice. Herewith, the signature generation apparatus is able to store therein multiple private keys for a single public key.

In this case, the signature scheme may be an NTRU signature scheme, which includes: a public key generation step of (i) generating, for a ring R which is a set of N-dimensional arrays where addition, subtraction, multiplication, and a norm indicating size of an element are defined, and for an ideal of the ring R, elements f and g of the ring R and an element Fq that is an inverse of f(mod q), and (ii) generating, as the public key, an element h that is congruent to a product of the element g and the element Fq mod q; a private key generation step of (i) generating a plurality of solutions (F, G)=(F_1, G_1), (F_2, G_2), ..., and (F_u, G_u), each of which is a pair of elements of the ring R, satisfies f×G−g×F=q, and has a norm that is smaller than a predetermined value, u being a positive integer larger than 1; and (ii) generating, as the plurality of private keys, a plurality of four-element sets (f, g, F_1, G_1), (f, g, F_2, G_2), and (f, g, F_u, G_u), each of which is a different one of the plurality of private keys; and a signature generation step of using one of the generated private keys to generate the signature data. Here, the plurality of private keys stored in the private key acquisition unit are generated in the private key generation step, and the signature generation unit generates the signature data in the signature generation step.

According to the structure, the signature scheme generates, using the ring R and ideal q, a public key and multiple private keys corresponding to the public key, and performs a digital signature operation using one of multiple generated private keys. Hence, by using the signature scheme, the signature generation apparatus is capable of performing a digital signature operation with the use of the private key corresponding to the public key in a reliable manner.

In this case, the signature generation apparatus may include therein a key generation apparatus for generating the public key and the plurality of private keys using the signature scheme.

According to the structure, the signature generation apparatus is able to generate the public key and the multiple private keys using the key generation apparatus included therein.

In this case, the predetermined acquisition method may be random acquisition of the private key, and the private key acquisition unit may randomly acquire the private key from among the plurality of private keys stored therein.

According to the structure, the signature generation apparatus randomly acquires, from among the stored multiple private keys, the private key different from one used in a previous digital signature operation. This thereby provides enhanced prevention against transcript attack.

In this case, the predetermined acquisition method may be acquisition of the private key in order of the plurality of private keys having been stored, and the private key acquisition unit may acquire the private key from among the plurality of private keys in the order of the plurality of private keys having been stored.

According to the structure, the signature generation apparatus changes a private key used in a digital signature operation with respect to each signature data. This thereby provides enhanced prevention against transcript attack.

In this case, the predetermined acquisition method may be acquisition of the private key by generating the private key according to the key generation method. Here, the private key acquisition unit (i) stores therein a $1^{st}$ private key corresponding to the public key and generated according to the signature scheme, (ii) generates, after using the $1^{st}$ private key, a $2^{nd}$ private key corresponding to the public key, according to the key generation method, (iii) updates the $1^{st}$ private key stored therein to the $2^{nd}$ private key, and (iv) acquires the $2^{nd}$ private key stored therein as the private key for generating the signature data.

According to the structure, the signature generation apparatus updates the $1^{st}$ private key to the $2^{nd}$ private key after using the $1^{st}$ private key. Therefore, the $2^{nd}$ private key, which is different from the $1^{st}$ private key, can be unfailingly used for generating the signature data.

The present invention is also a key generation apparatus for generating keys used for generation and verification of signature data for message data. The key generation apparatus comprises: a public key generation unit operable to generate a public key according to a signature scheme in which a plurality of private keys correspond to a public key; and a private key generation unit operable to generate the plurality of private keys according to the signature scheme.

According to the structure, the key generation apparatus generates a single public key and multiple private keys corresponding to the public key. Here, in the case where an apparatus performing a digital signature operation uses one of the multiple private keys in the operation, even if an attacker obtains signature data and attempts transcript attack, he/she does not know the obtained signature data was generated using which one of the multiple private keys. Thus, the key generation apparatus is able to prevent transcript attack on signature data.

In this case, the signature scheme may be a lattice-based signature scheme. Here, the public key generation unit generates the public key according to the signature scheme, and the private key generation unit generates the plurality of private keys according to the signature scheme.

According to the structure, the key generation apparatus performs key generation in a lattice-based signature scheme, and therefore is able to generate a single public key and multiple private keys corresponding to the public key due to the nature of the lattice.

In this case, the signature scheme may be an NTRU signature scheme, which includes: a public key generation step of (i) generating, for a ring R which is a set of N-dimensional arrays where addition, subtraction, multiplication, and a norm indicating a size of an element are defined, and for an ideal of the ring R, elements f and g of the ring R and an element Fq that is an inverse of f(mod q), and (ii) generating, as the public key, an element h that is congruent to a product of the element g and the element Fq mod q; and a private key generation step of (i) generating a plurality of solutions (F, G)=(F_1, G_1), (F_2, G_2), ..., and (F_u, G_u), each of which is a pair of elements of the ring R, satisfies f×G−g×F=q, and has a norm that is smaller than a predetermined value, u being a positive integer that is larger than 1; and (ii) generating, as the plurality of private keys, a plurality of four-element sets (f, g, F_1, G_1), (f, g, F_2, G_2), and (f, g, F_u, G_u), each of which is a different one of the plurality of private keys. Here, the public key generation unit generates the public key in the public key generation step, and the private key generation unit generates the plurality of private keys in the private key generation step.

According to the structure, the key generation apparatus uses the public key generation step and the private key generation step included in the signature scheme to whereby generate a public key and multiple private keys corresponding to the public key.

The present invention is also a signature system comprising a signature generation apparatus for generating signature data for message data and a signature verification apparatus for performing a signature verification. Here, the signature generation apparatus includes: a private key acquisition unit operable to acquire, according to a predetermined acquisition method, a private key from among a plurality of private keys generated using a key generation method of a signature scheme in which the plurality of private keys correspond to a single public key, the acquired private key being different from a private key used in a previous digital signature operation; and a signature generation unit operable to perform, using the acquired private key, a digital signature operation on the message data according to a signature method of the signature scheme to generate the signature data. The signature verification apparatus includes: a verification unit operable to perform a verification on the signature data using the public key.

According to the structure, the signature generation apparatus of the signature system acquires, from among multiple private keys corresponding to a single public key, a private key different from one used in a previous digital signature operation. Herewith, even if an attacker obtains signature data and attempts the transcript attack, he/she does not know the obtained signature data was generated using which one of the previously used private key and the private key used in this time's digital signature operation. Therefore, the signature generation apparatus is capable of preventing transcript attack on signature data. In addition, because the public key corresponds to each of the multiple private keys, the signature verification apparatus is able to perform a verification, using the public key, on signature data generated with the use of a private key from among the multiple private keys.

DETAILED DESCRIPTION OF THE INVENTION

1. Embodiment 1

A digital signature system 1 is described below as Embodiment 1 of the present invention with the aid of drawings.

Overview of Digital Signature System 1

Figure 1:
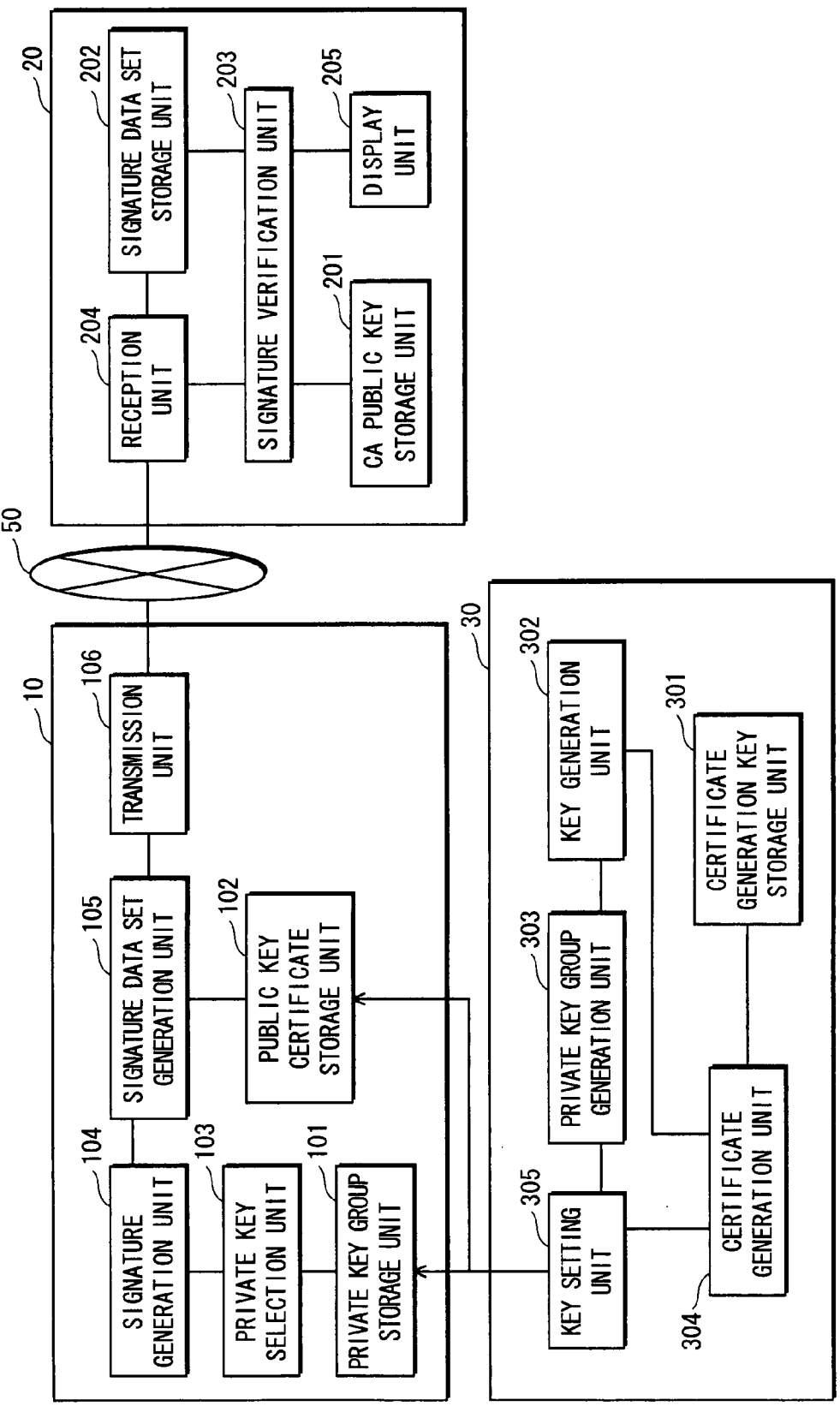
FIG. 1 is a block diagram showing a structure of a digital signature system 1.

The digital signature system 1, as shown in FIG. 1, comprises: a signature generation apparatus 10; a signature verification apparatus 20; a key generation apparatus 30; and a communication channel 50.

The key generation apparatus 30 performs key generation using the improved NTRUSign signature scheme, which is an improved version of the conventional NTRUSign signature scheme, and generates multiple private keys $\{(f, g), (F\_1, G\_1)\}$, $\{(f, g), (F\_2, G\_2)\}$, and ..., and a single public key h. Note that the key generation in the improved NTRUSign signature scheme is described hereinafter. The public key h is a public key corresponding to all the multiple private keys $\{(f, g), (F\_1, G\_1)\}$, $\{(f, g), (F\_2, G\_2)\}$, and ....

The signature generation apparatus 10 generates signature data set SS for message data m using one of the multiple private keys generated by the key generation apparatus 30 and the improved NTRUSign signature scheme, and transmits the generated signature data set SS to the signature verification apparatus 20 via the communication channel 50. Note that the structure of the signature data set SS is hereinafter described.

The signature verification apparatus 20 receives the signature data set SS from the signature generation apparatus 10, and verifies whether the received signature data set SS is an authentic signature of the message data m, using the improved NTRUSign signature scheme. When determining that the signature data set SS is the authentic signature, the signature verification apparatus 20 accepts the signature data set SS; whereas when determining it is an inauthentic signature, the signature verification apparatus 20 declines the signature data set SS.

In the key generation under the improved NTRUSign signature scheme, a single public key and multiple private keys corresponding to the public key are generated by using multiple elements in a polynomial ring R with integer coefficients and an ideal of the ring R modulo a polynomial $X^N-1$. Here, "$X^a$" denotes X to the power of a. For generating a signature under the improved NTRUSign signature scheme for a message, one private key and a 2·N-dimensional vector, which is a hash value of the message, are used. For the signature verification of the improved NTRUSign signature scheme, the public key, the signature added to the message, and the 2·N-dimentional vector are used. Since Non-Patent References 4 and 5 describe a ring and an ideal of the ring used in the NTRUSign signature scheme, their descriptions are left out here.

The following explains the improved NTRUSign signature scheme.

<Improved NTRUSign Signature Scheme>

(1) Parameters of Improved NTRUSign Signature Scheme

The improved NTRUSign signature scheme uses parameters of nonnegative integers, N, q, df, dg, and Normbound. The definitions of these parameters are the same as those of the conventional NTRUSign signature scheme. The following describes the meanings of these parameters.

(1-1) Parameter N

The improved NTRUSign signature scheme is a digital signature scheme that performs signature generation and verification using polynomial operations. The degree of a polynomial used in the improved NTRUSign signature scheme is determined by the parameter N.

Polynomials used in the improved NTRUSign signature scheme are polynomials of degree N−1 or less with integer coefficients for the above parameter N. A polynomial $X^4+X^3+1$ is an example in the case when N=5. Here, "$X^a$" denotes X to the power of a. Note that a (mod $X^N-1$) operation is performed on the polynomial so as to always calculate a polynomial of degree N−1 or less with integer coefficients. This is because, by performing the (mod $X^N-1$) operation, a relational expression $X^N=1$ is realized, and therefore a variable of degree N or more can always be converted into a variable of degree N−1 or less. Here, it can be understood that a polynomial with integer coefficients obtained by performing the (mod $X^N-1$) operation on a polynomial is an element in the polynomial ring R.

In addition, both a public key h and a signature s are expressed as polynomials of degree N−1 or less. Besides, the private key is a set of four polynomials of degree N−1 or less (f, g, F, G). Namely, f, g, F and G are all polynomials of degree N−1 or less and elements of the polynomial ring R. Note that the set of four (f, g, F, G) is treated as a further pair of two pairs (f, g) and (F, G) and hereinafter sometimes denoted as {(f, g), (F, G)}.

Then, the polynomial operation uses the relational expression $X^N=1$ for the parameter N to produce the result always being a polynomial of degree N−1 or less. For example, in the case where N=5, the product of a polynomial $X^4+X^2+1$ and a polynomial $X^3+X$ is always a polynomial of degree N−1 or less, as shown below, due to a relationship $X^5=1$:

$$(X^4 + X^2 + 1) \times (X^3 + X) = X^7 + 2 \cdot X^5 + 2 \cdot X^3 + X$$
$$= X^2 \cdot 1 + 2 \cdot 1 + 2 \cdot X^3 + X$$
$$= 2 \cdot X^3 + X^2 + X + 2$$

where × is the symbol for the multiplication of a polynomial by a polynomial, and · is the symbol for the multiplication of an integer by a polynomial (or an integer by an integer).

Note that, in the improved NTRUSign signature scheme also, a polynomial of degree N−1, $a=a\_0+a\_1 \cdot X+a\_2 \cdot X^2+ \ldots +a\_(N-1) \cdot X^{(N-1)}$ is equated with a vector $(a\_0, a\_1, a\_2, \ldots, a\_(N-1))$. $a\_0, a\_1, a\_2, \ldots$, and $a\_(N-1)$, are coefficients of the polynomial a and integers.

(1-2) Parameter q

The improved NTRUSign signature scheme uses the parameter q which is an integer of 2 or more and an ideal of the polynomial ring R. Coefficients of polynomials in the NTRUSign signature scheme are remainders modulo q.

(1-3) Parameters df and dg

How to select a polynomial f, which is a part of the private key used in the improved NTRUSign signature scheme, and a polynomial g used with the polynomial f for generating a polynomial h, which is the public key, is determined by parameters df and dg, respectively.

The polynomial f is selected so that df pieces of coefficients are 1 and the remaining coefficients are 0. That is, the polynomial f is a polynomial of degree N−1 or less, and has N pieces of coefficients from degree 0 (constant term) to degree N−1. Here, the polynomial f must be selected so that, among the N pieces of the coefficients, df pieces of coefficients are 1 and (N-df) pieces of coefficients are 0.

Then, the polynomial g is selected so that dg pieces of coefficients are 1 and the remaining coefficients are 0.

(1-4) Parameter Normbound

In the improved NTRUSign signature scheme, a distance between a 2·N-dimensional vector created from the signature s and a 2·N-dimensional vector, which is a hash value of the message, to be hereinafter described is calculated, and the authenticity of the signature is judged based on the distance. The Normbound is a threshold used in the judgment. Namely, if the distance is less than the Normbound, the signature is accepted as an authentic signature, whereas if the distance is the same as the Normbound or more, it is denied as an inauthentic signature.

Non-Patent Reference 4 gives an example of parameters of the NTRUSign signature scheme: (N, q, df, dg, Normbound) =(251, 128, 73, 71, 310). The improved NTRUSign signature scheme may use the same parameter example.

(2) Hash Value of Message and Distance Between Norm and Vector

The improved NTRUSign signature scheme also creates a signature corresponding to a hash value of a message m. The hash value of the message m is a polynomial pair of degree N, (m1, m2), and is equated with a 2·N-dimensional vector. Non-Patent Reference 1 details the hash function that calculates a hash value from a message.

The improved NTRUSign signature scheme also uses a distance of a vector as used by the conventional NTRUSign signature scheme. The following describes the definition.

A norm $\|a\|$ of the polynomial $a=a\_0+a\_1 \cdot X+a\_2 \cdot X^2+ \ldots +a\_(N-1) \cdot X^{(N-1)}$ is defined as:

$$\|a\|=\text{sqrt}((a\_0-\mu)^2+(a\_1-\mu)^2+ \ldots + (a\_(N-1)-\mu)^2),$$

$$\mu=(1/N) \cdot (a\_0+a\_1+a\_2+ \ldots +a\_(N-1)),$$

where sqrt(x) is a square root of x.

The norm $\|(a, b)\|$ of the pair (a, b) of the polynomials a and b is defined as:

$$\|(a,b)\|=\text{sqrt}(\|a\|^2+\|b\|^2).$$

The distance between the pair (a, b) of the polynomials a and b and the pair (c, d) of the polynomials c and d is defined as $\|(c-a, d-b)\|$.

Herewith, a polynomial of degree N−1 or less with integer coefficients obtained by performing the (mod $X^N-1$) operation can be regarded as an N-dimensional array in which the addition, subtraction, multiplication and norm indicating the size of an element are defined, and the polynomial ring R can be regarded as a collection of N-dimensional arrays.

(3) Key Generation in Improved NTRUSign Signature Scheme

The improved NTRUSign signature scheme randomly generates the polynomials f and g using the parameters df and dg, as mentioned above. Then, a polynomial Fq which satisfies $Fq \times f=1 \pmod{q}$ is used in an equation, $$h=Fq \times g \pmod{q}$$

to thereby generate the polynomial h. Here, the polynomial Fq is referred to as an inverse element of the polynomial f. Furthermore, a pair of the polynomials (F, G) that satisfies the following equation and has a norm smaller than a predetermined value Keybound is obtained.

$$f \times G - g \times F = q \quad (*)$$

Then, {(f, g), (F, G)} is set as a private key {(f, g), (F\_1, G\_1)}, and multiple other pairs of (F, G), each of which satisfies the equation (*) and has a norm smaller than the predetermined value Keybound, are found using {(f, g), (F\_1, G\_1)}. These other pairs are denoted as (F\_2, G\_2), (F\_3, G\_3), and . . . . Here, each of {(f, g), (F\_1, G\_1)}, {(f, g), (F\_2, G\_2)}, and . . . is a private key, and a set of these private keys is referred to as a private key group. Additionally, the polynomial h is here a public key. Note here that the improved NTRUSign signature scheme involves multiple private keys corresponding to a single public key, whereas the conventional NTRUSign signature scheme uses a single public key and a single private key, which correspond one-to-one with each other. In the NTRUSign signature scheme, if there is, with respect to a single public key, one pair (F, G) of the polynomials F and G satisfying the equation (*) and having a norm smaller than the predetermined value Keybound, multiple such pairs could exist. Embodiment 1, and Embodiment 2 to be hereinafter described, utilize this character.

The predetermined value Keybound is a norm of the pair (F, G) that constitutes a private key capable of generating signature data to be verified as an authentic signature. For example, when (N, q, df, dg, Normbound)=(251, 128, 73, 71, 310), Keybound=45. This is, according to Non-Patent Reference 5, a limit value of the norm of (F, G) to make the verification failure rate a likelihood that a signature generated with the use of the private key is determined as inauthentic at $10^\wedge(-12)$ or less. Since the limit value of the norm varies depending on the parameters (N, q, df, dg Normbound), the value of Keybound can be changed except when the above example is the case. Specifically speaking, the predetermined value Keybound can be, for example, the limit value of the norm of (F, G) to make the verification failure rate no more than $10^\wedge(-12)$. Alternatively, the verification failure rate can take another value, $10^\wedge(-15)$, for instance.

(4) Signature Generation in Improved NTRUSign Signature Scheme

In the signature generation under the improved NTRUSign signature scheme, the signature s for the message m, to which a digital signature operation is performed, is calculated. First, one private key $\{(f, g), (FS, GS)\}$ is selected from the multiple private keys included in the private key group.

Then, a 2·N-dimensional vector (m1, m2)—m1 and m2 are polynomials of degree N—which is a hash value for the message m, is calculated.

The 2·N-dimensional vector (m1, m2) and private key $\{(f, g), (FS, GS)\}$ are used to calculate the polynomials a, b, A and B satisfying the following equations:

$$GS \times m1 - FS \times m2 = A + q \times B; \text{ and}$$

$$-g \times m1 + f \times m2 = a + q \times b.$$

Here, coefficients of A and a are remainders obtained when G×m1−F×m2 is divided by the modulus q in a manner that the remainders fall in the range from <−q/2>+1 to <q/2>. That is, in the case where each remainder obtained by the division by the modulus q is between <q/2> and q−1, q is subtracted from the remainder so that the remainder is adjusted to fall in the above range. Here <x> denotes the largest number among numbers being x or less. For example, <−½>=−1.

Next, s and t are calculated using the following equations, and s is output as a signature:

$$s = f \times B + F \times b (\bmod q); \text{ and}$$

$$t = g \times B + G \times b (\bmod q).$$

(5) Signature Verification of Improved NTRUSign Signature Scheme

The signature verification method of the Improved NTRUSign signature scheme is the same as that of the conventional NTRUSign signature scheme. First, the 2·N-dimensional vector (m1, m2), which is a hash value for the message m, is calculated.

The polynomial t is calculated with the following equation using the public key h:

$$t = s \times h (\bmod q).$$

The distance between the 2·N-dimensional vectors (s, t) and (m1, m2) is found, and the distance is then checked whether to be less than the Normbound. When it is less than the Normbound, the signature s is accepted, being determined as the authentic signature. On the other hand, if the distance is the same as the Normbound or more, it is denied, being determined as an inauthentic signature.

1.2 Structure of Signature Generation Apparatus 10

The signature generation apparatus 10, as shown in FIG. 1, comprises: a private key group storage unit 101; a public key certificate storage unit 102; a private key selection unit 103; a signature generation unit 104; a signature data set generation unit 105; and a transmission unit 106.

The signature generation apparatus 10 stores therein the private key group including the multiple private keys, and a public key certificate corresponding to the public key, which have been generated by the key generation apparatus 30 in the above-mentioned improved NTRUSign signature scheme, and generates signature data S for the message data m entered thereto, using one private key included in the private key group.

(1) Private Key Group Storage Unit 101

The private key group storage unit 101 has an area for storing the private key group including the multiple private keys generated by the key generation apparatus 30.

Note that, in the following description, the private key group storage unit 101 shall stores therein a private key group GKS including multiple private keys $\{(f, g), (F\_1, G\_1)\}$, $\{(f, g), (F\_2, G\_2)\}, \ldots,$ and $\{(f, g), (F\_u, G\_u)\}$. Here, u denotes the number of private keys included in the private key group.

(2) Public Key Certificate Storage Unit 102

The public key certificate storage unit 102 has an area for storing a public key certificate CP of the public key h.

The public key certificate CP is composed of the public key h and signature data SP of the public key h, and generated by the key generation apparatus 30. The signature data SP is generated using a certificate generation key KCS stored in the key generation apparatus 30 and the improved NTRUSign signature scheme. In addition, the public key certificate CP shall be, in the description, prestored in the public key certificate storage unit 102 by the key generation apparatus 30. Note that the public key certificate CP may include other data besides the public key h and signature data SP. For example, the user's identifier and the expiration date for the certificate may be included therein.

(3) Private Key Selection Unit 103

When receiving, from the signature generation unit 104, a selection instruction indicating to select one private key from the private key group, the private key selection unit 103 randomly selects a private key from the multiple private keys included in the private key group GSK.

The private key selection unit 103 outputs the selected private key to the signature generation unit 104.

Note that the selection may not be performed randomly, and may be made based on an external input.

(4) Signature Generation Unit 104

When receiving, from the signature data set generation unit 105, a signature generation instruction indicating to generate signature data for the message data m, the signature generation unit 104 outputs a selection instruction to the private key selection unit 103.

When receiving the selected private key from the private key selection unit 103, the signature generation unit 104 generates the signature data S for the message data m using the received private key namely, generates the signature data S by performing digital signature operation on the message data m.

When the generation of the signature data S is complete, the signature generation unit 104 outputs a generation completion notice indicating the completion status to the signature data set generation unit 105.

Note that the signature data S is generated based on the improved NTRUSign signature scheme.

(5) Signature Data Set Generation Unit 105

When receiving the message data m according to a user's operation, the signature data set generation unit 105 reads the public key certificate CP from the public key certificate storage unit 102.

The signature data set generation unit 105 outputs a signature generation instruction to the signature generation unit 104.

Subsequently, when receiving the generation completion notice from the signature generation unit 104, the signature data set generation unit 105 generates the signature data set SS made up of the message data m, the signature data S generated by the signature generation unit 104 for the message data m, and the read public key certificate CP.

The signature data set generation unit 105 transmits the generated signature data set SS to the signature verification apparatus 20 via the transmission unit 106.

(6) Transmission Unit 106

The transmission unit 106 transmits the signature data set SS to the signature verification apparatus 20 via the communication channel 50.

1.3 Structure of Signature Verification Apparatus 20

The signature verification apparatus 20 comprises, as shown in FIG. 1: a CA public key storage unit 201; a signature data set storage unit 202; a signature verification unit 203; a reception unit 204; and a display unit 205.

(1) CA Public Key Storage Unit 201

The CA public key storage unit 201 stores therein a public key KCP corresponding to the certificate generation key KCS stored in the key generation apparatus 30 and used for verifying the public key certificate CP.

(2) Signature Data Set Storage Unit 202

The signature data set storage unit 202 has an area for storing the signature data set SS.

(3) Signature Verification Unit 203

The signature verification unit 203 performs verifications on the signature data S included in the signature data set SS and the signature data SP included in the public key certificate CP. Note that the signature verification unit 203 performs a verification of each signature data using the improved NTRU-Sign signature scheme.

The following describes the operation of signature data verifications.

The signature verification unit 203 receives a verification start instruction indicating to start an examination for verification from the reception unit 204.

The signature verification unit 203 verifies whether the signature data SP is an authentic signature of the public key h, using the CA public key KPC stored in the CA public key storage unit.

When determining that the signature data SP is the authentic signature, the signature verification unit 203 verifies whether the signature data S is an authentic signature of the message data m, using the public key h.

When determining that the signature data S is the authentic signature, the signature verification unit 203 outputs to the display unit 205, a message "OK" indicating to accept the received signature data set SS.

When determining that signature data is not the authentic signature in any of the signature verifications, the signature verification unit 203 outputs to the display unit 205, a message "NG" indicating to reject the received signature data set SS.

(4) Reception Unit 204

The reception unit 204 receives the signature data set SS transmitted from the signature generation apparatus 10 via the communication channel 50.

The reception unit 204 stores the received signature data set SS in the signature data set storage unit 202, and subsequently outputs the verification start instruction to the signature verification unit 203.

(5) Display Unit 205

When receiving a message regarding the result of the signature examinations from the signature verification unit 203, the display unit 205 displays the received message.

1.4 Structure of Key Generation Apparatus 30

The key generation apparatus 30, as shown in FIG. 1, comprises: a certificate generation key storage unit 301; a key generation unit 302; a private key group generation unit 303; a certificate generation unit 304; and a key setting unit 305.

(1) Certificate Generation Key Storage Unit 301

The certificate generation key storage unit 301 stores therein the certificate generation key KCS corresponding to the public key KCP and used for generating the signature data SP which is included in the public key certificate CP.

(2) Key Generation Unit 302

The key generation unit 302 generates the private key $\{(f, g), (F, G)\}$ and the public key h using the key generation method of the conventional NTRUSign signature scheme. Note that, since the key generation of the conventional NTRUSign signature scheme is a publicly known technique, the explanation is omitted here.

The key generation unit 302 outputs, to the private key group generation unit 303 and the certificate generation unit 304, a key group generation instruction indicating to generate a private key group and a certificate generation instruction indicating to generate the public key certificate CP, respectively.

(3) Private Key Group Generation Unit 303

The private key group generation unit 303 prestores therein the predetermined values Keybound and vMAX indicating the upper limit of the count of search operations for private keys. Here, vMAX is 1000, for example.

The private key group generation unit 303 generates multiple private keys by generating multiple pairs (a, b) of polynomials a and b, each of which has a norm $\|(a, b)\|$ being the predetermined value Keybound or less, in the search operations performed the number of times specified by the predetermined value vMAX, or less.

When receiving a key group generation instruction from the key generation unit 302, the private key group generation unit 303 generates the private key group GKS composed of $\{(f, g), (F\_1, G\_1)\}$, $\{(f, g), (F\_2, G\_2)\}$, ..., and $\{(f, g), (F\_u, G\_u)\}$ using the private key $\{(f, g), (F, G)\}$ generated by the key generation unit 302 and the key generation method of the improved NTRUSign signature scheme. Here, u denotes the number of the private keys included in the private key group.

When the generation of the private key group GKS is complete, the private key group generation unit 303 outputs, to the key setting unit 305, a $1^{st}$ storage instruction indicating to store the generated private key group GKS in the signature generation apparatus 10.

(4) Certificate Generation Unit 304

When receiving a certificate generation instruction from the key generation unit 302, the certificate generation unit 304 reads the certificate generation key KCS stored in the certificate generation key storage unit 301.

The certificate generation unit 304 generates, using the read certificate generation key KCS, the public key certificate CP corresponding to the public key h which is generated by the key generation unit 302. Here, the public key certificate CP is composed of the public key h of the public key certificate CP and the signature data SP using the certificate generation key KCS of the public key h.

When the generation of the public key certificate CP is complete, the certificate generation unit 304 outputs, to the key setting unit 305, a $2^{nd}$ storage instruction indicating to store the generated public key certificate CP in the signature generation apparatus 10.

(5) Key Setting Unit 305

When receiving a $1^{st}$ storage instruction from the private key group generation unit 303, the key setting unit 305 writes the private key group GSK generated by the private key group generation unit 303 to the private key group storage unit 101 of the signature generation apparatus 10.

When receiving a $2^{nd}$ storage instruction from the certificate generation unit 304, the key setting unit 305 writes the public key certificate CP generated by the certificate generation unit 304 to the public key certificate storage unit 102 of the signature generation apparatus 10.

1.5 Operation of Signature Generation Apparatus 10

Figure 2:
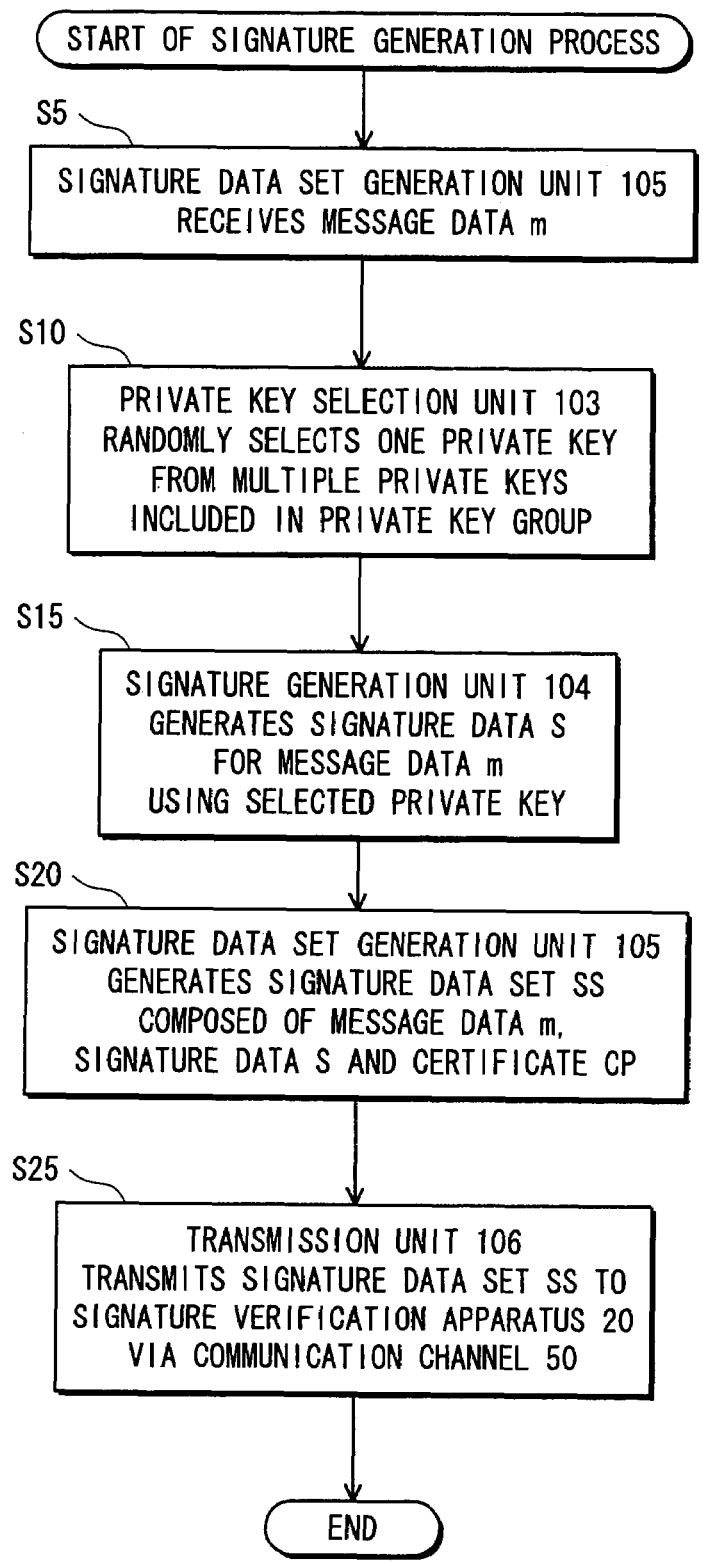
FIG. 2 is a flowchart showing operation of a signature generation process performed in a signature generation apparatus 10.

The signature generation apparatus 10 generates the signature data set SS for the message data m and transmits the signature data set SS to the signature verification apparatus 20 via the communication channel 50. The operation of the signature generation process performed in the signature generation apparatus 10 is explained next with reference to the flowchart of FIG. 2.

The signature data set generation unit 105 receives the message data m according to a user's operation (Step S5).

The signature data set generation unit 105 reads the public key certificate CP from the public key certificate storage unit 102 and outputs a signature generation instruction to the signature generation unit 104. When receiving the signature generation instruction from the signature data set generation unit 105, the signature generation unit 104 outputs a selection instruction to the private key selection unit 103. When receiving the selection instruction from the signature generation unit 104, the private key selection unit 103 randomly selects one private key from the multiple private keys included in the private key group GSK (Step S10).

The private key selection unit 103 outputs the selected private key to the signature generation unit 104. When receiving the selected private key from the private key selection unit 103, the signature generation unit 104 generates the signature data S for the message data m using the received private key (Step S15). Note that the signature data S is generated based on the improved NTRUSign signature scheme.

When the generation of the signature data S is complete, the signature generation unit 104 outputs a generation completion notice indicating the completion status to the signature data set generation unit 105. When receiving the generation completion notice from the signature generation unit 104, the signature data set generation unit 105 generates the signature data set SS made up of the message data m, the signature data S generated by the signature generation unit 104 for the message data m, and the read public key certificate CF (Step S20).

The transmission unit 106 transmits the signature data set SS generated by the signature data set generation unit 105 to the signature verification apparatus 20 via the communication channel 50 (Step S25).

1.6 Operation of Signature Verification Apparatus 20

Figure 3:
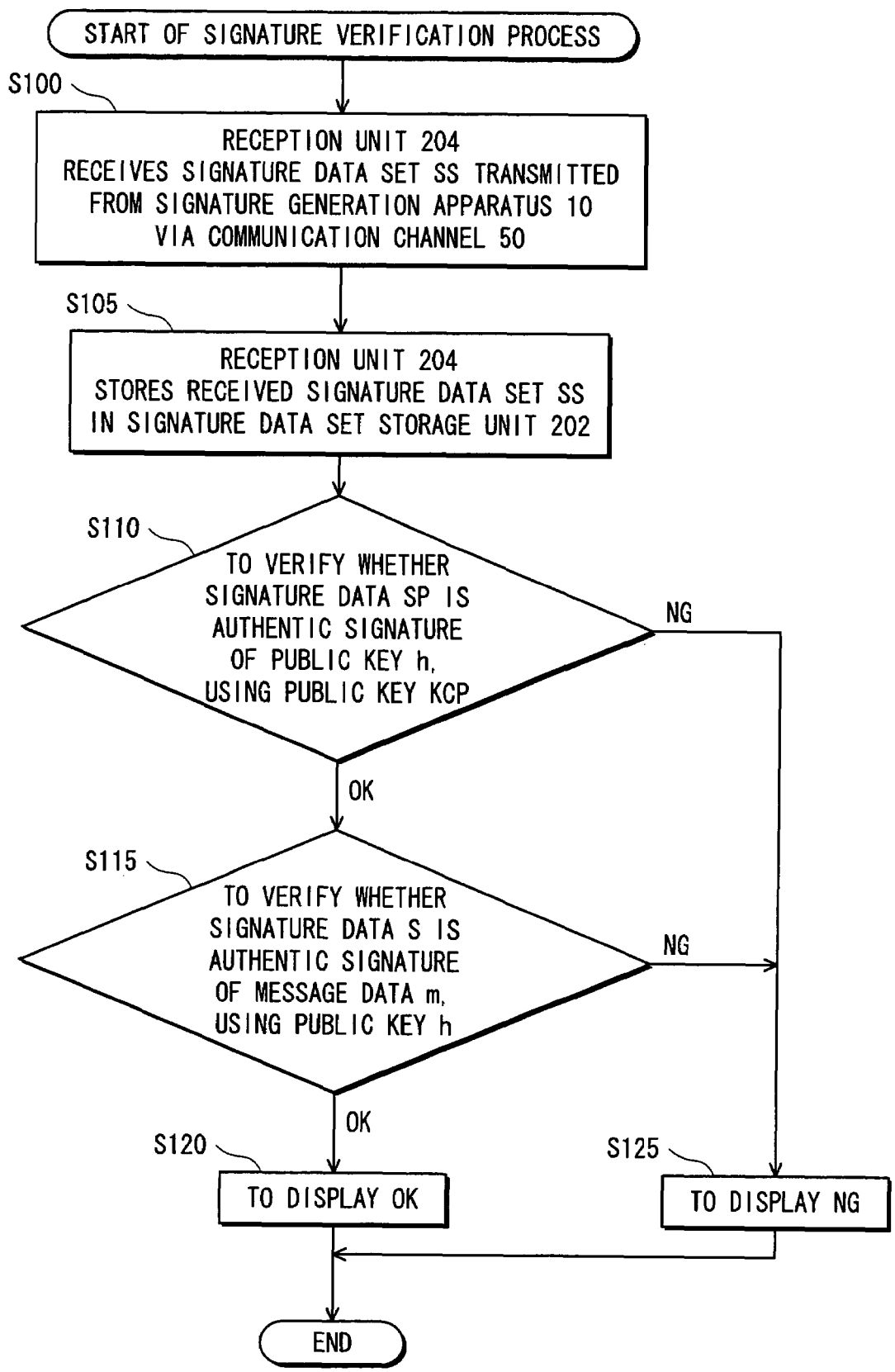
FIG. 3 is a flowchart showing operation of a signature verification process performed in a signature verification apparatus 20.

The signature verification apparatus 20 receives the signature data set SS from the signature generation apparatus 10 via the communication channel 50, and performs a verification of the signature data set SS for verification. The signature verification process performed in the signature verification apparatus 20 is explained with reference to the flowchart of FIG. 3. The reception unit 204 receives the signature data set SS transmitted form the signature generation apparatus 10 via the communication channel 50 (Step S100).

The reception unit 204 stores the received signature data set SS in the signature data set storage unit 202 (Step S105).

The reception unit 204 outputs a verification start instruction to the signature verification unit 203. The signature verification unit 203 receives the verification start instruction indicating to start a verification from the reception unit 204. The signature verification unit 203 verifies whether the signature data SP is an authentic signature of the public key h, using the CA public key KPC stored in the CA public key storage unit (Step S110).

When verifying that the signature data SP is the authentic signature ("OK" in Step S110), the signature verification unit 203 verifies whether the signature data S is an authentic signature of the message data m, using the public key h (Step S115).

When verifying that the signature data S is the authentic signature ("OK" in Step S115), the signature verification unit 203 displays a message "OK" via the display unit 205 (Step S120).

When determining that the signature data SP is not authentic ("NG" in Step S110) and when determining that the signature data S is not authentic ("NG" in Step S115), the signature verification unit 203 displays a message "NG" via the display unit 205 (Step S125).

Note that the signature verification unit 203 performs a verification of each signature data, using the improved NTRUSign signature scheme.

1.7 Operation of Key Generation Apparatus 30

The key generation apparatus 30 generates the private key group GKS and certificate CP, and sets the generated private key group GKS and certificate CP in the signature generation apparatus 10. The key generation process performed in the key generation apparatus 30 is explained with reference to the flowchart of FIG. 4.

The key generation unit 302 generates the private key {(f, g), (F, G)} and public key h using the key generation method of the conventional NTRUSign signature scheme (Step S200).

The key generation unit 302 outputs, to the private key group generation unit 303 and the certificate generation unit 304, a key group generation instruction indicating to generate a private key group and a certificate generation instruction indicating to generate the public key certificate CP, respectively. When receiving the key group generation instruction from the key generation unit 302, the private key group generation unit 303 generates the private key group GKS composed of {(f, g), (F_1, G_1)}, {(f, g), (F_2, G_2)}, . . . , and {(f, g), (F_u, G_u)} through the private key group generation process (Step S205). Here, u denotes the number of the private keys included in the private key group.

When receiving a certificate generation instruction from the key generation unit 302, the certificate generation unit 304 reads the certificate generation key KCS stored in the certificate generation key storage unit 301. The certificate generation unit 304 generates, using the read certificate generation key KCS, the public key certificate CP corresponding to the public key h which is generated by the key generation unit 302 (Step S210).

When the generation of the private key group GSK is complete, the private key group generation unit 303 outputs, to the key setting unit 305, a $1^{st}$ storage instruction indicating to store the generated private key group GSK in the signature generation apparatus 10. When the generation of the public key certificate CP is complete, the certificate generation unit 304 outputs, to the key setting unit 305, a $2^{nd}$ storage instruction indicating to store the generated public key certificate CP in the signature generation apparatus 10. When receiving the $1^{st}$ storage instruction from the private key group generation unit 303, the key setting unit 305 writes the private key group GSK generated by the private key group generation unit 303 to the private key group storage unit 101 of the signature generation apparatus 10. When receiving the $2^{nd}$ storage instruction from the certificate generation unit 304, the key setting unit 305 writes the public key certificate CP generated by the certificate generation unit 304 to the public key certificate storage unit 102 of the signature generation apparatus 10 (Step S215).

1.8 Method of Generating Private Key Group

Figure 4:
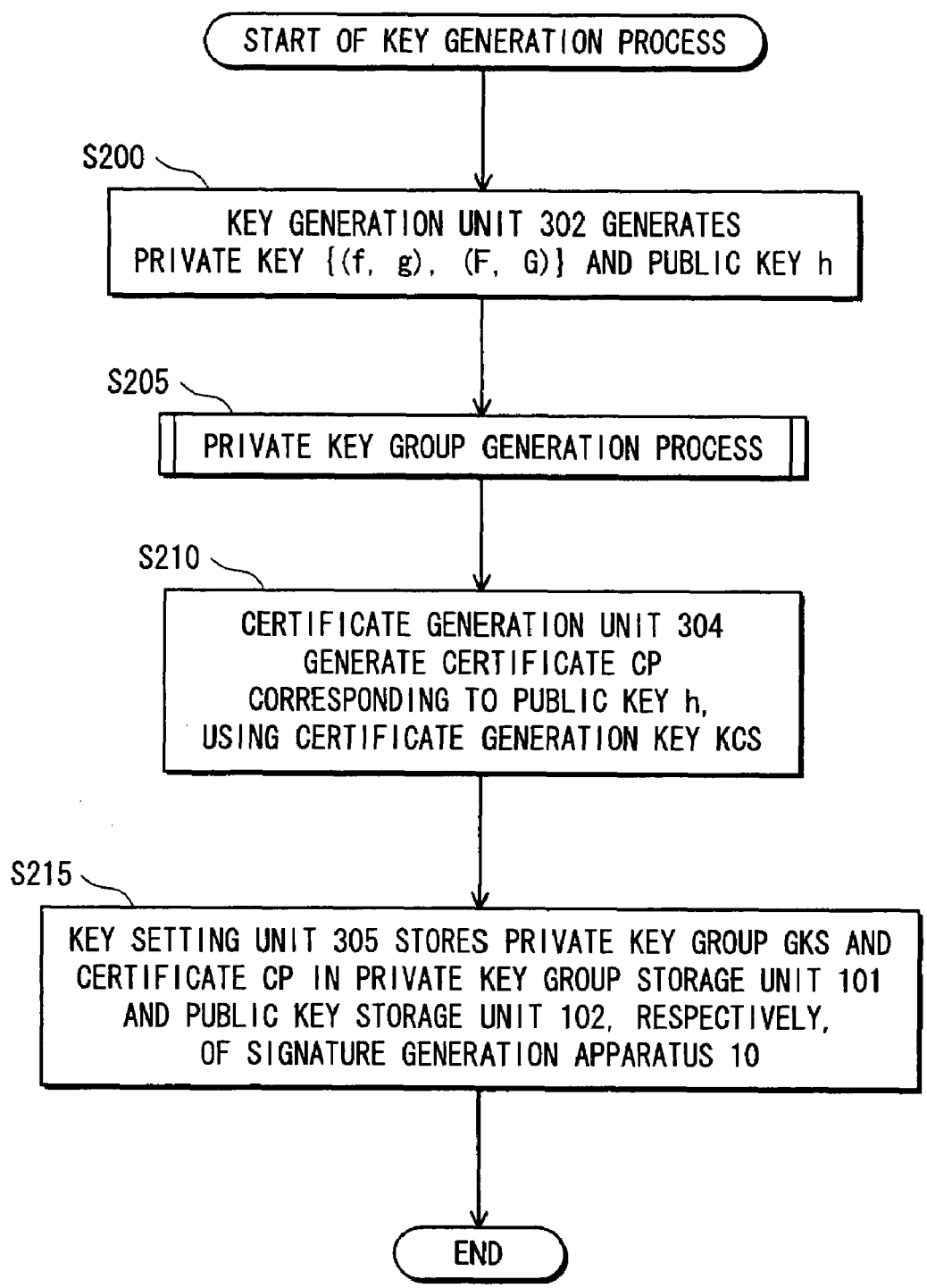
FIG. 4 is a flowchart showing operation of a key generation process performed in a key generation apparatus 30.
Figure 5:
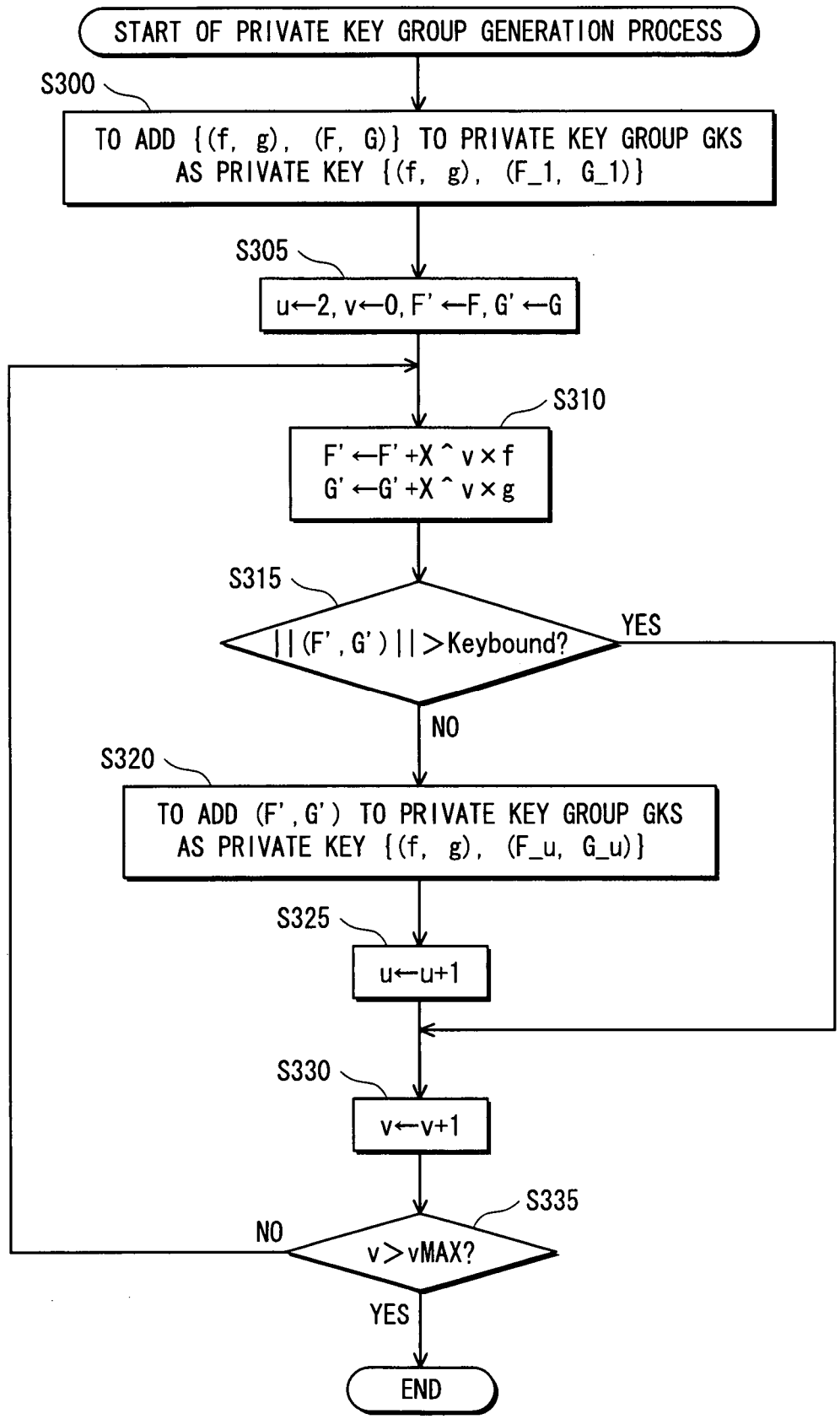
FIG. 5 is a flowchart showing operation of a private key group generation process performed in the key generation apparatus 30.

Here is described a method of generating the private key group GSK performed by the private key group generation unit 303 using the improved NTRUSign signature scheme— i.e. operation in the private key group generation process shown in FIG. 4—with reference to the flowchart of FIG. 5.

The private key group generation unit 303 adds the private key $\{(f, g), (F, G)\}$ generated by the key generation unit 302 to the private key group GKS as the private key $\{(f, g), (F\_1, G\_1)\}$ (Step S300).

The private key group generation unit 303 sets: $u \leftarrow 2$, $v \leftarrow 0$, $F' \leftarrow F$, and $G' \leftarrow G$ (Step S305).

Next, the private key group generation unit 303 sets: $F' \leftarrow F' + X^v \times f$, and $G' \leftarrow G' + X^v \times g$ (Step S310).

The private key group generation unit 303 judges whether $\|(F', G')\| > \text{Keybound}$ or not (Step S315).

When determining that $\|(F', G')\| > \text{Keybound}$ is not satisfied ("NO" in Step S315), the private key group generation unit 303 adds $(F', G')$ to the private key group GKS as the private key $\{(f, g), (F\_u, G\_u)\}$ (Step S320), and sets $u \leftarrow u+1$ (Step S325). The private key group generation unit 303 sets $v \leftarrow v+1$ (Step S330) and judges whether or not $v > v\text{MAX}$ (Step S335).

When determining that $v > v\text{MAX}$ ("YES" in Step S335), the private key group generation unit 303 finishes the process. When determining that $v > v\text{MAX}$ is not satisfied ("NO" in Step S335), the private key group generation unit 303 returns to Step S310.

When determining that $\|(F', G')\| > \text{Keybound}$ ("YES" in Step S315), the private key group generation unit 303 implements Step S330 and the subsequent steps.

Note that the private keys $\{(f, g), (F\_1, G\_1)\}$, $\{(f, g), (F\_2, G\_2)\}$, and . . . generated in the above-mentioned method satisfy $f \times G\_1 - g \times F\_1 = q$, $f \times G\_2 - g \times F\_2 = q$, and . . . , respectively. Since $\{(f, g), (F\_1, G\_1)\}$ is generated using the key generation method of the conventional NTRUSign signature scheme, $f \times G\_1 - g \times F\_1 = q$ is satisfied. The following shows that, when $f \times G\_i - g \times F\_i = q$ is satisfied for $\{(f, g), (F\_i, G\_i)\}$ with a given positive integer i, $f \times G\_{(i+1)} - g \times F\_{(i+1)} = q$ is satisfied for $\{(f, g), (F\_{(i+1)}, G\_{(i+1)})\}$. Due to Step S310 in the flowchart above, a polynomial w satisfying the following equations exists:

$$F\_{(i+1)} = F\_i + w \times f, \quad G\_{(i+1)} = G\_i + w \times g.$$

Accordingly, the following is satisfied:

$$\begin{aligned} f \times G\_{(i+1)} - g \times F\_{(i+1)} &= f \times (G\_i + w \times g) - g \times (F\_i + w \times f) \\ &= f \times G\_i + w \times f \times g - g \times F\_i + w \times f \times g \\ &= f \times G\_i - g \times F\_i \\ &= q. \end{aligned}$$

Hence, the private keys $\{(f, g), (F\_1, G\_1)\}$, $\{(f, g), (F\_2, G\_2)\}$, and . . . generated by the above-mentioned method satisfy $f \times G\_1 - g \times F\_1 = q$, $f \times G\_2 - g \times F\_2 = q$, and . . . , respectively.

The method of generating the private key group is not limited to the method mentioned above, and any method can be employed as long as it generates a private key group comprising private keys $\{(f, g), (F', G')\}$ satisfying $f \times G' - g \times F' = q$ and $\|(F', G')\| \leq \text{Keybound}$.

1.9 Overall Operation of Embodiment 1

Next is described the overall operation of the digital signature system 1 of Embodiment 1.

The key generation apparatus 30 of the digital signature system 1 generates a public key and a private key group of the signature generation apparatus 10, and sets these in the signature generation apparatus 10. The signature generation apparatus 10 generates the signature data set SS for the message data m, and transmits the generated signature data set SS to the signature verification apparatus 20 via the communication channel 50. The signature verification apparatus 20 receives the signature data set SS from the signature generation apparatus 10 via the communication channel 50, and perform a verification on the signature data set SS.

1.10 Advantageous Effect of Embodiment 1

In the digital signature system 1 of Embodiment 1, whereas there is one public key used for the signature verification, multiple private keys that correspond to the public key are present. The signature generation apparatus 10 selects one private key from the multiple private keys included in the private key group and generates signature data. Assume here that the number of private keys included in the private key group is two, and these private keys are $\{(f, g), (F\_1, G\_1)\}$ and $\{(f, g), (F\_2, G\_2)\}$. In this situation, an attacker attempting a transcript attack obtains signature data sets passing through the communication channel 50 to carry out the transcript attack. Since not knowing which private key was used to generate each of the obtained signature data sets, the attacker cannot implement an attack by sorting out the obtained signature data sets according to the used private keys and using these signature data sets. Then, if the attacker makes an attack by calculating a difference between a signature and a hash value with respect to each of the obtained signature data sets and finding their averages, information on two private keys enters the signature data sets because two private keys have been used. As a result, even if the attacker implements the transcript attack and obtains information on two private keys in the mixed state from the averages of the second and fourth moments, he/she cannot separate the obtained information into individual information on each private key. Thus, the digital signature system 1 is safe, capable of preventing transcript attack. Note that the number of private keys included in the private key group is two in the above case. However, when 3 or more private keys are included in the private key group, separating information on the private keys based on the averages of the second and fourth moments becomes more difficult, providing higher safety.

2. Embodiment 2

A digital signature system 1000 of Embodiment 2 of the present invention is described next with reference to drawings.

2.1 Overview of Digital Signature System 1000

The digital signature system 1000 comprises: a signature generation apparatus 1010; a signature verification apparatus 1020; and a communication channel 1050.

The signature generation apparatus 1010 generates signature data set SS for message data m using the NTRUSign signature scheme, and transmits the signature data set SS to the signature verification apparatus 1020 via the communication channel 1050. Note that the structure of the signature data set SS is hereinafter described.

The signature verification apparatus 1020 receives the signature data set SS from the signature generation apparatus 1010 and verifies whether the received signature data set SS is an authentic signature of the message data m. The signature verification apparatus 1020 accepts the signature data set SS when verifying that the signature data set SS is authentic, while declining the signature data set SS when determining that the signature data set SS is inauthentic.

2.2 Structure of Signature Generation Apparatus 1010

Figure 6:
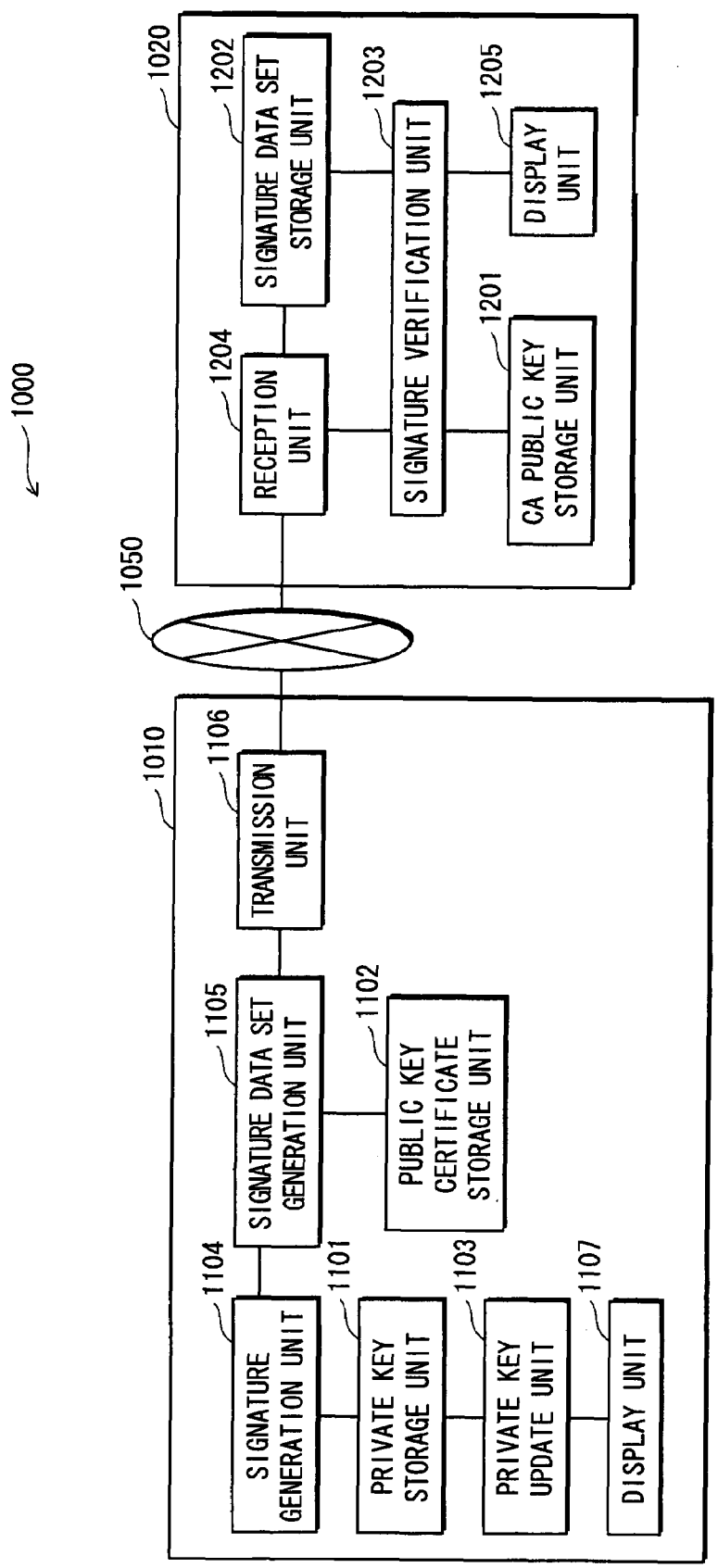
FIG. 6 is a block diagram showing a structure of a digital signature system 1000.

The signature generation apparatus 1010 comprises, as shown in FIG. 6: a private key storage unit 1101; a public key certificate storage unit 1102; a private key update unit 1103; a signature generation unit 1104; a signature data set generation unit 1105; a transmission unit 1106; and a display unit 1107.

The signature generation apparatus 1010 generates the signature data set SS for the message data m entered thereto, and transmits the generated signature data set SS to the signature verification apparatus 1020.

The signature data set generation unit 1105 and transmission unit 1106 constituting the signature generation apparatus 1010 perform similar operations of the signature data set generation unit 105 and the transmission unit 106, respectively, of Embodiment 1, and therefore their descriptions are omitted here.

(1) Private Key Storage Unit 1101

The private key storage unit 1101 has an area for storing a private key $\{(f, g), (F, G)\}$.

Assume here that the private key storage unit 1101 prestores therein the private key $\{(f, g), (F, G)\}$.

(2) Public Key Certificate Storage Unit 1102

The public key certificate storage unit 1102 has an area for storing a public key certificate CP of a public key h corresponding to the private key $\{(f, g), (F, G)\}$.

The public key certificate CP is composed of the public key h and signature data SP of the public key h. The signature data SP is generated based on the improved NTRUSign signature scheme. In addition, assume here that the public key certificate storage unit 1102 prestores therein the public key certificate CP. Note that the public key certificate CP may include other data besides the public key h and the signature data SP. For example, the user's identifier and the expiration date for the certificate may be included therein.

(3) Private Key Update Unit 1103

The private key group generation unit 1103 prestores therein predetermined values Keybound and vMAX which indicates the upper limit of the count of search operations for private keys. Here, vMAX is 1000, for example.

The private key update unit 1103 updates the private key stored in the private key storage unit 1101 periodically—every month, for example—according to the following operation. Note that the update of the private key may be performed on a monthly, daily, or hourly basis.

The private key update unit 1103 generates a private key $\{(f, g), (F', G')\}$ that corresponds to the public key h but differ from the private key $\{(f, g), (F, G)\}$ stored in the private key storage unit 1101 by generating a pair $(F', G')$, whose norm $\|(F', G')\|$ is equal to or smaller than the predetermined value Keybound, in the search operations performed the number of times specified by the predetermined value vMAX, or less, using the improved NTRUSign signature scheme.

The private key update unit 1103 updates the private key stored in the private key storage unit 1101 by overwriting with the newly generated $\{(f, g), (F', G')\}$.

When being not able to generate the pair $(F', G')$ in the search operations performed the number of times specified by vMAX, the private key update unit 1103 displays, via the display unit 1107, an update failure message indicating that the private key cannot be updated.

The method of updating the private key is described hereinafter in detail.

(4) Signature Generation Unit 1104

When receiving a signature generation instruction indicating to generate signature data for the message data m from the signature data set generation unit 1105, the signature generation unit 1104 reads the private key from the private key storage unit 1101.

The signature generation unit 1104 generates signature data S for the message data m using the read private key—i.e. generates the signature data S by performing digital signature operation on the message data m.

When the generation of the signature data S is complete, the signature generation unit 1104 outputs a generation completion notice indicating the completion status to the signature data set generation unit 1105.

Note that the signature data S is generated based on the improved NTRUSign signature scheme.

(5) Display Unit 1107

The display unit 1107 displays a message received from the private key update unit 1103.

2.3 Signature Verification Apparatus 1020

The signature verification apparatus 1020 comprises, as shown in FIG. 6: a CA public key storage unit 1201; a signature data set storage unit 1202; a signature verification unit 1203; a reception unit 1204; and a display unit 1205.

The CA public key storage unit 1201, signature data set storage unit 1202, signature verification unit 1203, reception unit 104 and display unit 1205 constituting the signature verification apparatus 1020 perform similar operations as the CA public key storage unit 201, signature data set storage unit 202, signature verification unit 203, reception unit 204, and display unit 205, respectively, of Embodiment 1, and therefore their descriptions are omitted here.

2.4 Method of Updating Private Key

The method of updating the private key (private key update process) performed by the private key update unit 1103 is explained with reference to the flowchart of FIG. 7.

The private key update unit 1103 reads $\{(f, g), (F, G)\}$ from the private key storage unit 1101 as a private key $\{(f, g), (F\_1, G\_1)\}$ (Step S400).

As to the variables v, F' and G', the private key update unit 1103 sets: $v \leftarrow 0$, $F' \leftarrow F$, and $G' \leftarrow G$ (Step S405).

As to the variables F' and G', the private key update unit 1103 sets: $F' \leftarrow F' + X^v \times f$, and $G' \leftarrow G' + X^v \times g$ (Step S410).

The private key update unit 1103 judges whether or not the norm $\|(F', G')\|$ is larger than the predetermined value Keybound (Step S415).

When determining that the norm $\|(F', G')\|$ is larger than the predetermined value Keybound ("YES" in Step S415), the private key update unit 1103 sets the variable v as $v \leftarrow v+1$ (Step S420), and judges whether or not the variable v is larger than the predetermined value vMAX (Step S425).

When determining that the variable v is larger than the predetermined value vMAX ("YES" in Step S425), the private key update unit 1103 displays an update failure message via the display unit 1107 (Step S430). When determining that the variable v is not larger than the predetermined value vMAX ("NO" in Step S425), the private key update unit 1103 returns to Step S410.

When determining that the norm $\|(F', G')\|$ is larger than the predetermined value Keybound ("NO" in Step S415), the private key update unit 1103 updates the private key stored in the private key storage unit 1101 by overwriting with the generated private key {(f, g), (F', G')} to thereby set new private key {(f, g), (F, G)} (Step S435).

Note that the private key {(f, g), (F', G')} generated in the method above satisfies f×G'−g×F'=q. The method of updating the private key is not limited to the above-mentioned method, and any method can be employed as long as it updates the private key to the {(f, g), (F', G')} satisfying f×G'−g×F'=q and ||(F', G')||≦Keybound.

2.5 Operation of Signature Generation Apparatus 1010

The operation of the signature generation apparatus 1010 includes: a "signature generation process" in which the signature data set SS for the message data m is generated and then transmitted to the signature verification apparatus 1020 via the communication channel 1050; and a "private key update process" that updates the private key. The operation of each process is described next.

Figure 8:
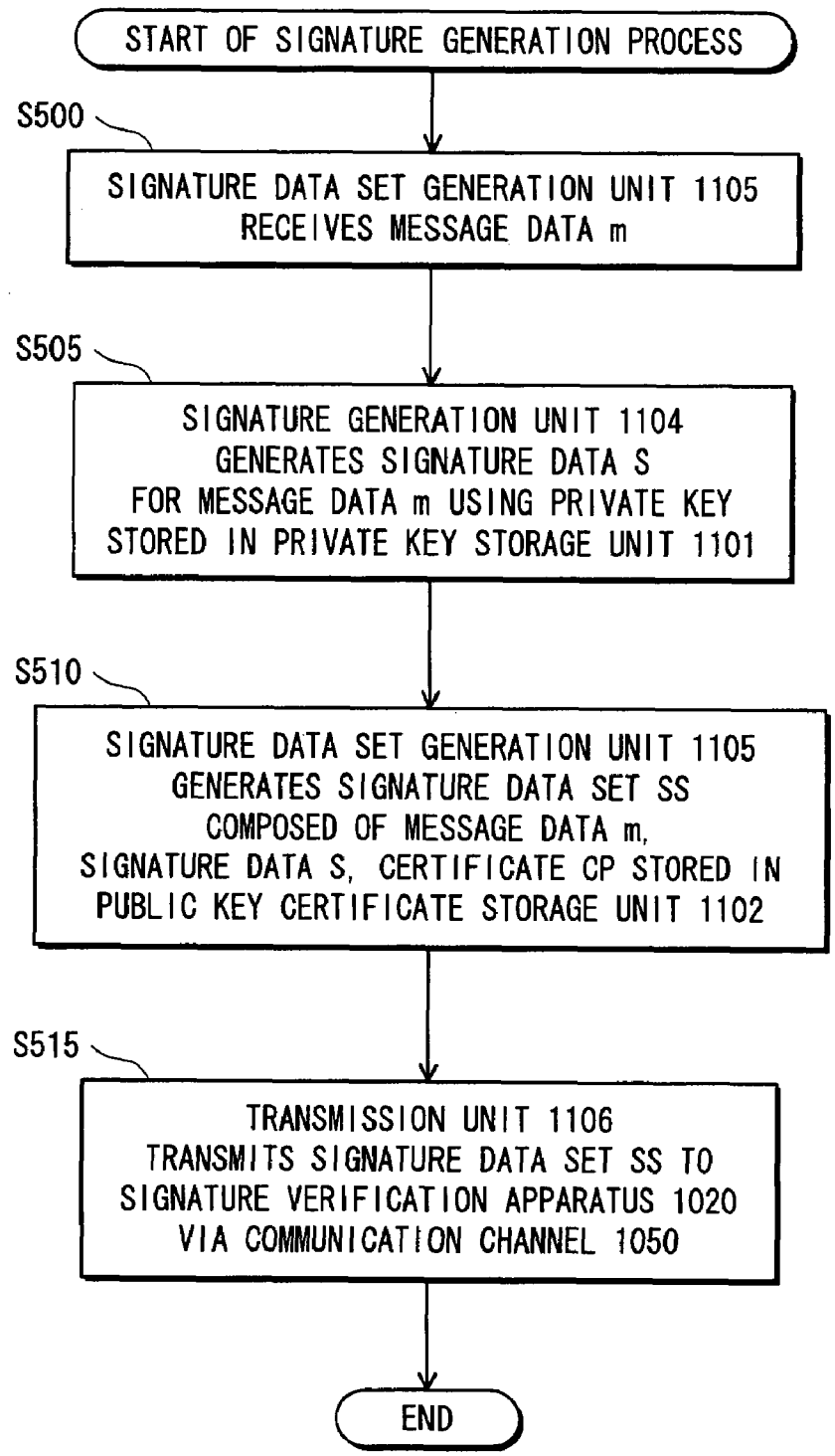
FIG. 8 is a flowchart showing operation of a signature generation process performed in the signature generation apparatus 1010.

(1) Signature Generation Process The operation of the signature generation process is explained with reference to the flowchart of FIG. 8.

The signature data set generation unit 1105 receives the message data m according to a user's operation (Step S500).

The signature data set generation unit 1105 reads the public key certificate CP from the public key certificate storage unit 1102, and outputs a signature generation instruction to the signature generation unit 1104. When receiving the signature generation instruction from the signature data set generation unit 1105, the signature generation unit 1104 reads the private key from the private key storage unit 1101. The signature generation unit 1104 generates the signature data S for the message data m using the read private key (Step S505).

When the generation of the signature data S is complete, the signature generation unit 1104 outputs a generation completion notice indicating the completion status to the signature data set generation unit 1105. When receiving the generation completion notice from the signature generation unit 1104, the signature data set generation unit 1105 generates the signature data set SS made up of the message data m, the signature data S generated by the signature generation unit 1104 for the message data m, and the read public key certificate CP (Step S510).

The transmission unit 1106 transmits the signature data set SS generated by the signature data set generation unit 1105 to the signature verification apparatus 1020 via the communication channel 1050 (Step S515).

(2) Private Key Update Process

The private key update unit 1103 generates a new private key {(f, g), (F', G')} using the private key {(f, g), (F, G)} stored in the private key storage unit 1101, and updates the private key stored in the private key storage unit 1101 by overwriting with the newly generated {(f, g), (F', G')}.

Figure 7:
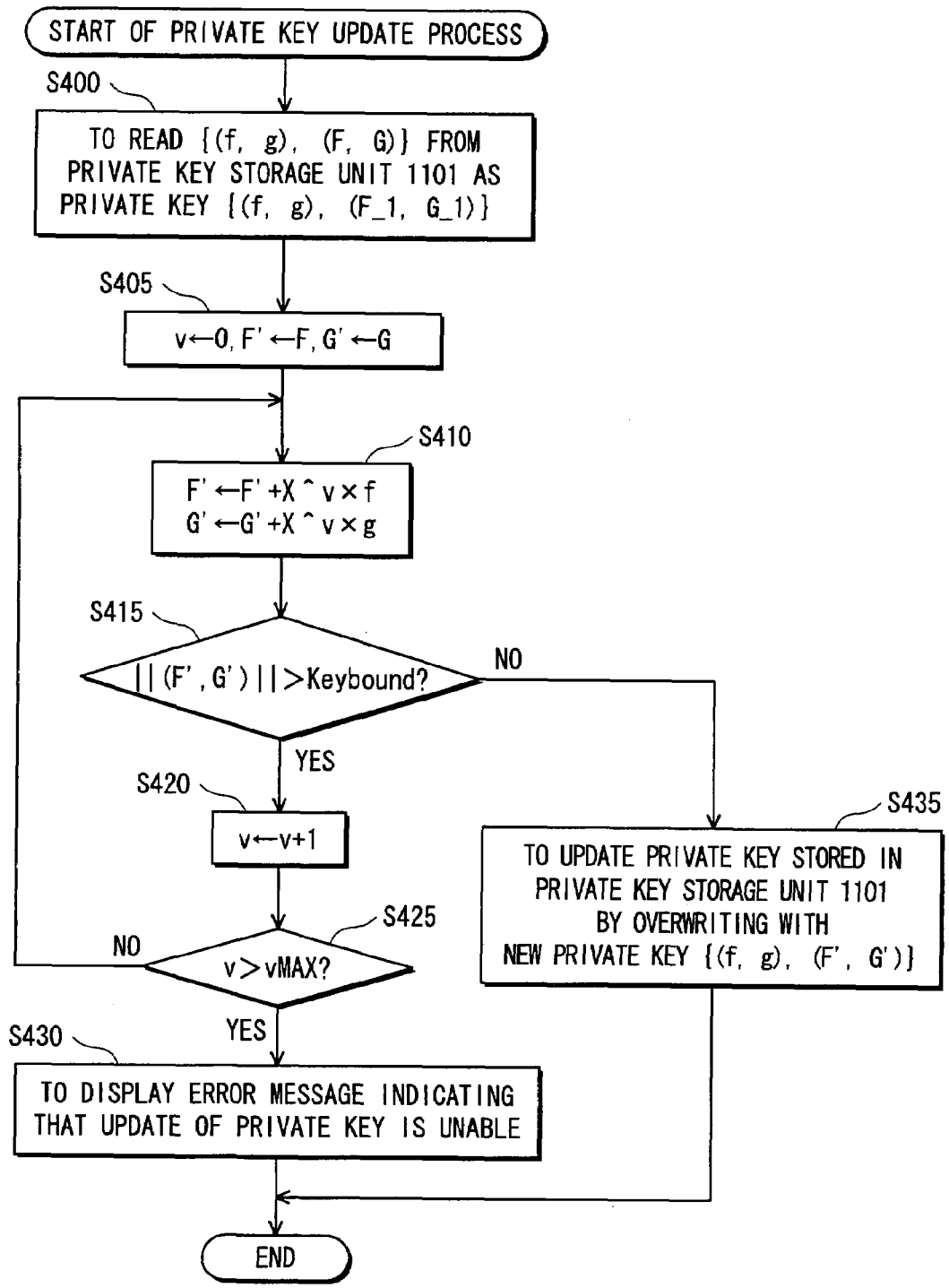
FIG. 7 is a flowchart showing operation of a private key update process performed in a signature generation apparatus 1010.

Note that the detailed operation is shown in FIG. 7, and the explanation is therefore omitted here.

2.6 Operation of Signature Verification Apparatus 1020

The signature verification apparatus 1020 receives the signature data set SS from the signature generation apparatus 1010 via the communication channel 1050, and performs a verification of the signature data set SS. Since the signature verification process performed in the signature verification apparatus 1020 is the same as that shown in the flowchart of FIG. 3 according to Embodiment 1, the explanation is omitted here.

2.7 Overall Operation of Embodiment 2

Next is described the overall operation of the digital signature system 1000 of Embodiment 2.

In the "signature generation process", the signature generation apparatus 1010 of the digital signature system 1000 generates the signature data set SS for the message data m entered thereto, and transmits the signature data set SS to the signature verification apparatus 1020. Receiving the signature data set SS from the signature generation apparatus 1010, the signature verification apparatus 1020 performs a verification on the received signature data set SS, and decides whether to accept or decline the signature data set SS depending on the verification result. In the "key update process", the signature generation apparatus 1010 updates the private key.

2.8 Advantageous Effect of Embodiment 2

In the digital signature system 1000 of Embodiment 2, whereas there is one public key used for the signature verification, a private key that corresponds to the public key keeps updated. An attacker who obtains signature data sets from the communication channel 1050 and performs transcript attack does not know the update timing. Assume that the private key has been updated only once. Since the attacker does not know the update timing of the private keys used for generating the obtained signature data sets, he/she cannot implement an attack by sorting out the obtained signature data sets according to the used private keys and using these signature data sets. Then, if the attacker makes an attack by calculating a difference between a signature and a hash value with respect to each of the all obtained signature data sets and finding their averages, information on two private keys enters the signature data sets, unless the obtained signature data sets are accurately sorted out according to the private keys, because two private keys have been used over different periods of time with some transition time point. As a result, even if the attacker implements transcript attack and obtains information on two private keys in the mixed state from the averages of the second and fourth moments, he/she cannot separate the obtained information into individual information of each private key. Thus, the digital signature system 1000 is safe, capable of preventing transcript attack, similarly to the digital signature system 1 of Embodiment 1.

3. Modifications

Embodiments 1 and 2 described above are merely the implementation examples of the present invention. The present invention is therefore not limited to these embodiments and can be implemented as embodiments in various forms within the scope of the invention. The following cases, for example, are also included in the present invention.

(1) In the Embodiment 1, each value of the pair (f, g) is fixed and the values of the pair (G, F) are changed; however, the present invention is not limited to this. Multiple private keys can be set by varying the values of the pair (f, g). In this case, the condition for a key of the NTRUSign signature scheme, f×G−g×F=q, has to be satisfied. Alternatively, the values of the pair (f, g) may be made variable while the values of the pair (F, G) being fixed.

In addition, Embodiment 2 may also perform the update of the private key with variable values of the pair (f, g). Alternatively, the values of the pair (f, g) may be made variable while the values of the pair (F, G) being fixed.

(2) The value of vMAX indicating the count of search operations for private keys of the private key group generation unit of Embodiment 1 and the private key update unit of Embodiment 2 is not limited to 1000, and may take another value, e.g., 10000.

(3) In Embodiment 1, a private key is randomly selected. However, the selection may be made based on a defined rule.

For example, the signature generation apparatus, while counting the number of times a signature data set is generated, may use the same private key until a first predetermined number of times (e.g. $10^7$) is reached. Then, a different private key is used until a second predetermined number of times (e.g. $10^8$) is reached. In this case, by specifying the private key currently in use with a pointer, the signature generation apparatus is able to use the same private key until the first predetermined number of times is reached. In such a case also, the attacker does not know the timing at which the private keys for use are changed, the present invention is therefore safe from transcript attack. Note that the number of generated signature data pieces may be counted instead.

The signature generation apparatus may perform the selection of a private key in an order of the multiple private keys being stored. In this case, the signature generation apparatus is able to select a private key in such order by specifying the currently-used private key with a pointer and shifting the pointer to a private key to be used next. Herewith, the signature generation apparatus is able to obtain a different private key from one used in the previous digital signature operation and generate signature data using the newly obtained private key.

(4) In Embodiment 2, the timing for updating the private key may depend on the number of times a signature data set is generated. For example, the private key is updated when a signature data set has been generated a predetermined number of times (e.g. $10^7$). In such a case also, the attacker does not know the timing at which the private keys for use are changed, the present invention is therefore safe from transcript attack.

(5) In Embodiments 1 and 2, the NTRUSign signature scheme or the improved scheme based on the NTRUSign signature scheme is used as their signature scheme. However, the present invention is not limited to this, and can employ any signature scheme which allows multiple private keys to correspond to a single public key.

An example of such is a lattice-based signature scheme different from the NTRUSign signature scheme.

(6) In Embodiment 1, the key generation apparatus and signature generation apparatus are constructed as different apparatuses. However, the present invention is not limited to this. The digital signature system 1 may comprise: an apparatus composed of the key generation apparatus and the signature generation apparatus; and the signature verification apparatus.

(7) In Embodiment 1, the signature generation apparatus receives message data according to a user's operation. However, the present invention is not limited to this.

The signature generation apparatus may receive message data from an external apparatus.

Also, in Embodiment 2, the signature generation apparatus may receive message data from an external apparatus.

(8) The present invention may be a combination of these embodiments and modifications above.

<Other Modifications>

Note that the present invention has been described based on the above embodiments, however, it is a matter of course that the present invention is not limited to the above embodiments. The following cases are also within the scope of the present invention.

(1) Each apparatus above is, specifically speaking, a computer system made up of a microprocessor, a ROM, a RAM, a hard disk unit, a display unit, a keyboard, a mouse and the like. A computer program is stored in the RAM or the hard disk unit. The microprocessor operates according to the computer program, and thereby each apparatus fulfills the functions. Here, the computer program is composed of combined multiple instruction codes which are command to the computer system to achieve predetermined functions.

(2) Part or all of the components making up the above individual devices may be assembled as a single system LSI (Large Scale Integration). The system LSI is an ultra-multifunctional LSI produced by integrating multiple components on one chip, and more specifically, is a computer system composed of a microprocessor, ROM, RAM, and the like. A computer program is stored in the RAM. The microprocessor operates according to the computer program, and thereby the system LSI accomplishes its function.

(3) Part or all of the components making up the above individual devices may be assembled as an IC card or a stand-alone module detachable from each device. The IC card and the module are computer systems composed of a microprocessor, ROM, RAM, and the like. These IC card and module may include the above-mentioned ultra-multifunctional LSI. The microprocessor operates according to a computer program, and thereby the IC card or the module accomplishes its function. Additionally, the IC card and module may have a tamper resistance.

(4) The present invention may be a method of accomplishing the above described inauthentic contents detection system. The present invention may be a computer program that achieves the method by a computer, or may be a digital signal representing the computer program.

The present invention may also be achieved by a computer-readable recording medium, such as a flexible disk, a hard disk, a CD-ROM (Compact Disk Read Only Memory), MO (Magneto-Optical) disk, a DVD, a DVD-ROM (Digital Versatile Disk Read Only Memory), a DVD-RAM (Digital Versatile Disk Random Access Memory), a BD (Blu-ray Disk), or a semiconductor memory, on which the above-mentioned computer program or digital signal is recorded. The present invention may also be the computer program or the digital signal recorded on such a storage medium.

The present invention may also be the computer program or digital signal to be transmitted via networks, as represented by telecommunications, wire/wireless communications, and the Internet, or via data broadcasting.

The present invention may also be a computer system having a microprocessor and memory, wherein the memory stores the computer program and the microprocessor operates according to the computer program.

The computer program or digital signal may be recorded on the above storage medium and transferred to an independent computer system, or alternatively, may be transferred to an independent computer system via the above network. Then, the independent computer system may execute the computer program or digital signal.

(5) The present invention includes a structure in which two or more of the above embodiments and modifications are combined.

4. Summary

The present invention is a signature generation apparatus for generating signature data for message data with the use of a signature scheme that allows multiple private keys to correspond to one public key. The signature generation apparatus comprises: a private key group storage unit storing therein a private key group that includes the multiple private keys; a public key certificate storage unit storing therein one of the public key and a certificate of the public key; a private key selection unit operable to select one private key from the multiple private keys included in the private key group; and a signature generation unit operable to generate the signature data for the message data using the selected private key.

In this case, the signature scheme may include: a key generation step of (i) generating, for a ring R which is a set of N-dimensional arrays where the addition, subtraction, multiplication, and a norm indicating the size of an element are defined, and for an ideal of the ring R, elements f and g of the ring R and an element Fq that is an inverse of f(mod q), (ii) generating, as the public key, an element h that is congruent to a product of the element g and the element Fq mod q, (iii) generating multiple solutions (F, G)=(F_1, G_1), (F_2, G_2), . . . , and (F_u, G_u) (u is a positive integer that is larger than 1), each of which is a pair of elements of the ring R, satisfying f×G−g×F=q and having a norm that is smaller than a predetermined value, and (iv) generating, as the private keys, multiple four-element sets (f, g, F_1, G_1), (f, g, F_2, G_2), . . . , and (f, g, F_u, G_u) each including the elements f, g, F and G; a signature generation step of generating the signature data for the message data with the use of the selected private key; and a signature verification step of verifying the signature data with the use of the public key.

In this case, the private key selection unit may randomly select the one private key from the multiple private keys included in the private key group.

The present invention is also a key generation apparatus using a signature scheme that allows multiple private keys to correspond to one public key to generate the public key and the private keys. The signature scheme includes: a key generation step of (i) generating, for a ring R which is a set of N-dimensional arrays where the addition, subtraction, multiplication, and a norm indicating the size of an element are defined, and for an ideal of the ring R, elements f and g of the ring R and an element Fq that is an inverse of f(mod q), (ii) generating, as the public key, an element h that is congruent to a product of the element g and the element Fq mod q, (iii) generating multiple solutions (F, G)=(F_1, G_1), (F_2, G_2), . . . , and (F_u, G_u) (u is a positive integer that is larger than 1), each of which is a pair of elements of the ring R, satisfying f×G−g×F=q and having a norm that is smaller than a predetermined value, and (iv) generating, as the private keys, multiple four-element sets (f, g, F_1, G_1), (f, g, F_2, G_2), . . . , and (f, g, F_u, G_u) each including the elements f, g, F and G; a signature generation step of generating the signature data for the message data with the use of one of the private keys; and a signature verification step of verifying the signature data with the use of the public key. Here, in the key generation step, the public key and the multiple private keys are generated.

The present invention is also a signature generation apparatus for generating signature data for message data with the use of a signature scheme that allows multiple private keys to correspond to one public key. The signature generation apparatus comprises: a private key storage unit storing a private key corresponding to the public key; a public key certificate storage unit storing one of the public key and a certificate of the public key; a signature generation unit operable to generate the signature data for the message data with the use of the private key; and a private key update unit operable to update the private key to a new private key that corresponds to the public key.

In this case, the signature scheme may include: a key generation step of (i) generating, for a ring R which is a set of N-dimensional arrays where the addition, subtraction, multiplication, and a norm indicating the size of an element are defined, and for an ideal of the ring R, elements f and g of the ring R and an element Fq that is an inverse of f(mod q), (ii) generating, as the public key, an element h congruent to a product of the element g and the element Fq mod q, (iii) generating a pair of elements (F, G) of the ring R, satisfying f×G−g×F=q and having a norm that is smaller than a predetermined value, and (iv) generating, as the private key, a four-element set (f, g, F, G) including the elements f, g, F and G; a signature generation step of generating the signature data for the message data with the use of the private key; and a signature verification step of verifying the signature data with the use of the public key.

The present invention is also a digital signature system comprising: a signature generation apparatus for generating signature data for message data with the use of a signature scheme that allows multiple private keys to correspond to one public key; and a signature verification apparatus for verifying the signature data. Here, the signature generation apparatus comprises: a private key group storage unit storing therein a private key group that includes the multiple private keys; a public key certificate storage storing therein one of the public key and a certificate of the public key; a private key selection unit operable to select one private key from the multiple private keys included in the private key group; and a signature generation unit operable to generate the signature data for the message data using the selected private key.

The present invention is also a signature generation method of generating signature data for message data with the use of a signature scheme that allows multiple private keys to correspond to one public key. The signature generation method comprises: a private key group storing step of storing a private key group that includes the multiple private keys; a public key certificate storing step of storing one of the public key and a certificate of the public key; a private key selecting step of selecting one private key from the multiple private keys included in the private key group; and a signature generating step of generating the signature data for the message data using the selected private key.

The present invention is also a signature generation method of generating signature data for message data with the use of a signature scheme that allows multiple private keys to correspond to one public key. The signature generation method comprises: a private key storing step of storing a private key corresponding to the public key; a public key certificate storing step of storing one of the public key and a certificate of the public key; a signature generating step of generating the signature data for the message data using the private key; and a private key updating step of updating the private key to a new private key that corresponds to the public key.

The present invention is also a program used on a signature generation apparatus for generating signature data for message data with the use of a signature scheme that allows multiple private keys to correspond to one public key. The program causes the signature generation apparatus to execute: a private key group storing step of storing a private key group that includes the multiple private keys; a public key certificate storing step of storing one of the public key and a certificate of the public key; a private key selecting step of selecting one private key from the multiple private keys included in the private key group; and a signature generating step of generating the signature data for the message data using the selected private key.

In this case, the signature scheme includes: a key generation step of (i) generating, for a ring R which is a set of N-dimensional arrays where the addition, subtraction, multiplication, and a norm indicating the size of an element are defined, and an for ideal of the ring R, elements f and g of the ring R and an element Fq that is an inverse of f(mod q), (ii) generating, as the public key, an element h that is congruent to a product of the element g and the element Fq mod q, (iii)

generating multiple solutions (F, G)=(F_1, G_1), (F_2, G_2), and (F_u, G_u) (u is a positive integer larger than 1), each of which is a pair of elements of the ring R, satisfying f×G−g×F=q and having a norm that is smaller than a predetermined value, and (iv) generating, as the private keys, multiple four-element sets (f, g, F_1, G_1), (f, g, F_2, G_2), . . . , and (f, g, F_u, G_u) each including the elements f, g, F and G; a signature generation step of generating the signature data for the message data with the use of the selected private key; and a signature verification step of verifying the signature data with the use of the public key.

In this case, the private key selecting step may randomly select the one private key from the multiple private keys included in the private key group.

The present invention is also a program used on a signature generation apparatus for generating signature data for message data with the use of a signature scheme that allows multiple private keys to correspond to one public key. The program causes the signature generation apparatus to execute: a private key storing step of storing a private key corresponding to the public key; a public key certificate storing step of storing one of the public key and a certificate of the public key; a signature generating step of generating the signature data for the message data using the private key; and a private key updating step of updating the private key to a new private key that corresponds to the public key.

In this case, the signature scheme may include: a key generation step of (i) generating, for a ring R which is a set of N-dimensional arrays where the addition, subtraction, multiplication, and a norm indicating the size of an element are defined, and for an ideal of the ring R, elements f and g of the ring R and an element Fq that is an inverse of f(mod q), (ii) generating, as the public key, an element h that is congruent to a product of the element g and the element Fq mod q, (iii) generating a pair of elements (F, G) of the ring R, satisfying f×G−g×F=q and having a norm that is smaller than a predetermined value, and (iv) generating, as the private key, a four-element set (f, g, F, G) including the elements f, g, F and G; a signature generation step of generating the signature data for the message data with the use of the private key; and a signature verification step of verifying the signature data with the use of the public key.

The present invention is also an integrated circuit of a signature generation apparatus for generating signature data for message data with the use of a signature scheme that allows multiple private keys to correspond to one public key. The integrated circuit comprises: a private key group storage unit storing therein a private key group that includes the multiple private keys; a public key certificate storage storing therein one of the public key and a certificate of the public key; a private key selection unit operable to select one private key from the multiple private keys included in the private key group; and a signature generation unit operable to generate the signature data for the message data using the selected private key.

The present invention is also an integrated circuit of a signature generation apparatus for generating signature data for message data with the use of a signature scheme that allows multiple private keys to correspond to one public key. The integrated circuit comprises: a private key storage unit storing a private key corresponding to the public key; a public key certificate storage unit storing one of the public key and a certificate of the public key; a signature generation unit operable to generate the signature data for the message data with the use of the private key; and a private key update unit operable to update the private key to a new private key that corresponds to the public key.

According to the structure of the digital signature system above, transcript attack can be prevented.

In addition, each apparatus consisting the digital signature system can be manufactured and marketed operationally, continuously and repeatedly electric equipment manufacturing industries.

The invention claimed is:

1. A signature generation apparatus for generating signature data for message data, the signature generation apparatus comprising:
  a private key acquisition unit operable to acquire, according to a predetermined acquisition method, a private key from among a plurality of private keys generated using a key generation method of a signature scheme in which the plurality of private keys correspond to a single public key, the acquired private key being different from a private key used in a previous digital signature operation; and
  a signature generation unit operable to perform, using the acquired private key, a digital signature operation on the message data according to a signature method of the signature scheme to generate the signature data,
  wherein the private key acquisition unit stores therein the plurality of private keys,
  wherein the signature scheme is a lattice-based signature scheme,
  wherein the plurality of private keys stored in the private key acquisition unit are generated using the key generation method of the lattice-based signature scheme,
  wherein the signature scheme is an NTRU signature scheme, including:
    a public key generation step of (i) generating, for a ring R which is a set of N-dimensional arrays where addition, subtraction, multiplication, and a norm indicating a size of an element are defined, and for an ideal of the ring R, elements f and g of the ring R and an element Fq that is an inverse of f(mod q), and (ii) generating, as the public key, an element h that is congruent to a product of the element g and the element Fq mod q;
    a private key generation step of (i) generating a plurality of solutions (F, G)=(F_1, G_1), (F_2, G_2), . . . , and (F_u, G_u), each of which is a pair of elements of the ring R, satisfies f×G−g×F=q, and has a norm that is smaller than a predetermined value, u being a positive integer that is larger than 1, and (ii) generating, as the plurality of private keys, a plurality of four-element sets (f, g, F_1, G_1), (f, g, F_2, G_2), and (f, g, F_u, G_u), each of which is a different one of the plurality of private keys; and
    a signature generation step of using one of the generated private keys to generate the signature data,
  wherein the plurality of private keys stored in the private key acquisition unit are generated in the private key generation step, and
  wherein the signature generation unit generates the signature data in the signature generation step.

2. The signature generation apparatus of claim 1, wherein the predetermined acquisition method is a random acquisition of the private key, and
  the private key acquisition unit randomly acquires the private key from among the plurality of private keys.

3. The signature generation apparatus of claim 1, including therein a key generation apparatus for generating the public key and the plurality of private keys using the signature scheme.

4. The signature generation apparatus of claim 1, wherein
the predetermined acquisition method is a random acquisition of the private key, and
the private key acquisition unit randomly acquires the private key from among the plurality of private keys stored therein.

5. The signature generation apparatus of claim 1, wherein
the predetermined acquisition method is an acquisition of the private key in an order of the plurality of private keys having been stored, and
the private key acquisition unit acquires the private key from among the plurality of private keys in the order of the plurality of private keys having been stored.

6. The signature generation apparatus of claim 1, wherein
the predetermined acquisition method is an acquisition of the private key by generating the private key according to the key generation method, and
the private key acquisition unit (i) stores therein a first private key corresponding to the public key and generated according to the signature scheme, (ii) generates, after using the first private key, a second private key corresponding to the public key, according to the key generation method, (iii) updates the first private key stored therein to the second private key, and (iv) acquires the second private key stored therein as the private key for generating the signature data.

7. A key generation apparatus for generating keys used for generation and verification of signature data for message data, the key generation apparatus comprising:
a public key generation unit operable to generate a public key according to a signature scheme in which a plurality of private keys correspond to a public key; and
a private key generation unit operable to generate the plurality of private keys according to the signature scheme,
wherein the signature scheme is a lattice-based signature scheme,
wherein the public key generation unit generates the public key according to the signature scheme,
wherein the private key generation unit generates the plurality of private keys according to the signature scheme,
wherein the signature scheme is an NTRU signature scheme, including:
a public key generation step of (i) generating, for a ring R which is a set of N-dimensional arrays where addition, subtraction, multiplication, and a norm indicating a size of an element are defined, and for an ideal of the ring R, elements f and g of the ring R and an element Fq that is an inverse of f(mod q), and (ii) generating, as the public key, an element h that is congruent to a product of the element g and the element Fq mod q; and
a private key generation step of (i) generating a plurality of solutions $(F, G)=(F\_1, G\_1), (F\_2, G\_2), \ldots,$ and $(F\_u, G\_u)$, each of which is a pair of elements of the ring R, satisfies $f \times G - g \times F = q$, and has a norm that is smaller than a predetermined value, u being a positive integer that is larger than 1, and (ii) generating, as the plurality of private keys, a plurality of four-element sets $(f, g, F\_1, G\_1), (f, g, F\_2, G\_2), \ldots,$ and $(f, g, F\_u, G\_u)$, each of which is a different one of the plurality of private keys,
wherein the public key generation unit generates the public key in the public key generation step, and
wherein the private key generation unit generates the plurality of private keys in the private key generation step.

8. A signature system comprising a signature generation apparatus for generating signature data for message data and a signature verification apparatus for performing a signature verification,
wherein the signature generation apparatus includes:
a private key acquisition unit operable to acquire, according to a predetermined acquisition method, a private key from among a plurality of private keys generated using a key generation method of a signature scheme in which the plurality of private keys correspond to a single public key, the acquired private key being different from a private key used in a previous digital signature operation; and
a signature generation unit operable to perform, using the acquired private key, a digital signature operation on the message data according to a signature method of the signature scheme to generate the signature data,
wherein the signature verification apparatus includes:
a verification unit operable to perform a verification on the signature data using the public key,
wherein the private key acquisition unit stores therein the plurality of private keys,
wherein the signature scheme is a lattice-based signature scheme,
wherein the plurality of private keys stored in the private key acquisition unit are generated using the key generation method of the lattice-based signature scheme,
wherein the signature scheme is an NTRU signature scheme, including:
a public key generation step of (i) generating, for a ring R which is a set of N-dimensional arrays where addition, subtraction, multiplication, and a norm indicating a size of an element are defined, and for an ideal of the ring R, elements f and g of the ring R and an element Fq that is an inverse of f(mod q), and (ii) generating, as the public key, an element h that is congruent to a product of the element g and the element Fq mod q;
a private key generation step of (i) generating a plurality of solutions $(F, G)=(F\_1, G\_1), (F\_2, G\_2), \ldots,$ and $(F\_u, G\_u)$, each of which is a pair of elements of the ring R, satisfies $f \times G - g \times F = q$, and has a norm that is smaller than a predetermined value, u being a positive integer that is larger than 1, and (ii) generating, as the plurality of private keys, a plurality of four-element sets $(f, g, F\_1, G\_1), (f, g, F\_2, G\_2), \ldots,$ and $(f, g, F\_u, G\_u)$, each of which is a different one of the plurality of private keys; and
a signature generation step of using one of the generated private keys to generate the signature data,
wherein the plurality of private keys stored in the private key acquisition unit are generated in the private key generation step, and
wherein the signature generation unit generates the signature data in the signature generation step.

9. A signature generation method used on a signature generation apparatus for generating signature data for message data, the signature generation method comprising:
a private key acquisition step of acquiring, according to a predetermined acquisition method, a private key from among a plurality of private keys generated using a key generation method of a signature scheme in which the plurality of private keys correspond to a single public key, the acquired private key being different from a private key used in a previous digital signature operation; and
a first signature generation step of performing, using the acquired private key, a digital signature operation on the message data according to a signature method of the signature scheme to generate the signature data,
wherein the private key acquisition step comprises storing the plurality of private keys, wherein the signature scheme is a lattice-based signature scheme, wherein the stored plurality of private keys are generated using the key generation method of the lattice-based signature scheme, wherein the signature scheme is an NTRU signature scheme, including:

a public key generation step of (i) generating, for a ring R which is a set of N-dimensional arrays where addition, subtraction, multiplication, and a norm indicating a size of an element are defined, and for an ideal of the ring R, elements f and g of the ring R and an element Fq that is an inverse of f(mod q), and (ii) generating, as the public key, an element h that is congruent to a product of the element g and the element Fq mod q;

a private key generation step of (i) generating a plurality of solutions $(F, G)=(F\_1, G\_1), (F\_2, G\_2), \ldots,$ and $(F\_u, G\_u)$, each of which is a pair of elements of the ring R, satisfies $f \times G - g \times F = q$, and has a norm that is smaller than a predetermined value, u being a positive integer that is larger than 1, and (ii) generating, as the plurality of private keys, a plurality of four-element sets $(f, g, F\_1, G\_1), (f, g, F\_2, G\_2), \ldots,$ and $(f, g, F\_u, G\_u)$, each of which is a different one of the plurality of private keys; and a second signature generation step of using one of the generated private keys to generate the signature data, wherein the stored plurality of private keys at the private key acquisition unit are generated in the private key generation step, and wherein the first signature generation step generates the signature data in the second signature generation step.

10. A computer-readable recording medium having encoded thereon a signature generation program used on a signature generation apparatus for generating signature data for message data, the signature generation program causing the signature generation apparatus to execute a method comprising:

a private key acquisition step of acquiring, according to a predetermined acquisition method, a private key from among a plurality of private keys generated using a key generation method of a signature scheme in which the plurality of private keys correspond to a single public key, the acquired private key being different from a private key used in a previous digital signature operation; and a first signature generation step of performing, using the acquired private key, a digital signature operation on the message data according to a signature method of the signature scheme to generate the signature data, wherein the private key acquisition step comprises storing the plurality of private keys, wherein the signature scheme is a lattice-based signature scheme, wherein the stored plurality of private keys are generated using the key generation method of the lattice-based signature scheme, wherein the signature scheme is an NTRU signature scheme, including:

a public key generation step of (i) generating, for a ring R which is a set of N-dimensional arrays where addition, subtraction, multiplication, and a norm indicating a size of an element are defined, and for an ideal of the ring R, elements f and g of the ring R and an element Fq that is an inverse of f(mod q), and (ii) generating, as the public key, an element h that is congruent to a product of the element g and the element Fq mod q;

a private key generation step of (i) generating a plurality of solutions $(F, G)=(F\_1, G\_1), (F\_2, G\_2), \ldots,$ and $(F\_u, G\_u)$, each of which is a pair of elements of the ring R, satisfies $f \times G - g \times F = q$, and has a norm that is smaller than a predetermined value, u being a positive integer that is larger than 1, and (ii) generating, as the plurality of private keys, a plurality of four-element sets $(f, g, F\_1, G\_1), (f, g, F\_2, G\_2),$ and $(f, g, F\_u, G\_u)$, each of which is a different one of the plurality of private keys; and a second signature generation step of using one of the generated private keys to generate the signature data, wherein the stored plurality of private keys at the private key acquisition unit are generated in the private key generation step, and wherein the first signature generation step generates the signature data using the second signature generation step.

11. A key generation method used on a key generation apparatus for generating keys that are used to generate and verify signature data for message data, the key generation method comprising:

a first public key generation step of generating a public key according to a signature scheme in which a plurality of private keys correspond to a public key; and a first private key generation step of generating the plurality of private keys according to the signature scheme, wherein the signature scheme is a lattice-based signature scheme, wherein the public key generation unit generates the public key according to the signature scheme, wherein the private key generation unit generates the plurality of private keys according to the signature scheme, wherein the signature scheme is an NTRU signature scheme, including:

a second public key generation step of (i) generating, for a ring R which is a set of N-dimensional arrays where addition, subtraction, multiplication, and a norm indicating a size of an element are defined, and for an ideal of the ring R, elements f and g of the ring R and an element Fq that is an inverse of f(mod q), and (ii) generating, as the public key, an element h that is congruent to a product of the element g and the element Fq mod q; and a second private key generation step of (i) generating a plurality of solutions $(F, G)=(F\_1, G\_1), (F\_2, G\_2), \ldots,$ and $(F\_u, G\_u)$, each of which is a pair of elements of the ring R, satisfies $f \times G - g \times F = q$, and has a norm that is smaller than a predetermined value, u being a positive integer that is larger than 1, and (ii) generating, as the plurality of private keys, a plurality of four-element sets $(f, g, F\_1, G\_1), (f, g, F\_2, G\_2), \ldots,$ and $(f, g, F\_u, G\_u)$, each of which is a different one of the plurality of private keys, wherein the first public key generation step generates the public key using the second public key generation step, and wherein the first private key generation step generates the plurality of private keys using the second private key generation step.

12. A computer-readable recording medium having encoded thereon a key generation program used on a key generation apparatus for generating keys that are used to generate and verify signature data for message data, the key generation program causing the key generation apparatus to execute a method comprising:
- a first public key generation step of generating a public key according to a signature scheme in which a plurality of private keys correspond to a public key; and
- a first private key generation step of generating the plurality of private keys according to the signature scheme, wherein the signature scheme is a lattice-based signature scheme, wherein the public key generation unit generates the public key according to the signature scheme, wherein the private key generation unit generates the plurality of private keys according to the signature scheme, wherein the signature scheme is an NTRU signature scheme, including:
- a second public key generation step of (i) generating, for a ring R which is a set of N-dimensional arrays where addition, subtraction, multiplication, and a norm indicating a size of an element are defined, and for an ideal of the ring R, elements f and g of the ring R and an element Fq that is an inverse of f(mod q), and (ii) generating, as the public key, an element h that is congruent to a product of the element g and the element Fq mod q; and
- a second private key generation step of (i) generating a plurality of solutions $(F, G)=(F\_1, G\_1), (F\_2, G\_2), \ldots$, and $(F\_u, G\_u)$, each of which is a pair of elements of the ring R, satisfies $f \times G - g \times F = q$, and has a norm that is smaller than a predetermined value, u being a positive integer that is larger than 1, and (ii) generating, as the plurality of private keys, a plurality of four-element sets $(f, g, F\_1, G\_1), (f, g, F\_2, G\_2), \ldots$, and $(f, g, F\_u, G\_u)$, each of which is a different one of the plurality of private keys, wherein the first public key generation step generates the public key using the second public key generation step, and wherein the first private key generation step generates the plurality of private keys using the second private key generation step.

13. An integrated circuit of a signature generation apparatus for generating signature data for message data, the integrated circuit comprising:
- a private key acquisition unit operable to acquire, according to a predetermined acquisition method, a private key from among a plurality of private keys generated using a key generation method of a signature scheme in which the plurality of private keys correspond to a single public key, the acquired private key being different from a private key used in a previous digital signature operation; and
- a signature generation unit operable to perform, using the acquired private key, a digital signature operation on the message data according to a signature method of the signature scheme to generate the signature data, wherein the private key acquisition unit stores therein the plurality of private keys, wherein the signature scheme is a lattice-based signature scheme, wherein the plurality of private keys stored in the private key acquisition unit are generated using the key generation method of the lattice-based signature scheme, wherein the signature scheme is an NTRU signature scheme, including:
- a public key generation step of (i) generating, for a ring R which is a set of N-dimensional arrays where addition, subtraction, multiplication, and a norm indicating a size of an element are defined, and for an ideal of the ring R, elements f and g of the ring R and an element Fq that is an inverse of f(mod q), and (ii) generating, as the public key, an element h that is congruent to a product of the element g and the element Fq mod q;
- a private key generation step of (i) generating a plurality of solutions $(F, G)=(F\_1, G\_1), (F\_2, G\_2), \ldots$, and $(F\_u, G\_u)$, each of which is a pair of elements of the ring R, satisfies $f \times G - g \times F = q$, and has a norm that is smaller than a predetermined value, u being a positive integer that is larger than 1, and (ii) generating, as the plurality of private keys, a plurality of four-element sets $(f, g, F\_1, G\_1), (f, g, F\_2, G\_2)$, and $(f, g, F\_u, G\_u)$, each of which is a different one of the plurality of private keys; and
- a signature generation step of using one of the generated private keys to generate the signature data, wherein the plurality of private keys stored in the private key acquisition unit are generated in the private key generation step, and wherein the signature generation unit generates the signature data in the signature generation step.

14. An integrated circuit of a key generation apparatus for generating keys used for generation and verification of signature data for message data, the integrated circuit comprising:
- a public key generation unit operable to generate a public key according to a signature scheme in which a plurality of private keys correspond to a public key; and
- a private key generation unit operable to generate the plurality of private keys according to the signature scheme, wherein the signature scheme is a lattice-based signature scheme, wherein the public key generation unit generates the public key according to the signature scheme, wherein the private key generation unit generates the plurality of private keys according to the signature scheme, wherein the signature scheme is an NTRU signature scheme, including:
- a public key generation step of (i) generating, for a ring R which is a set of N-dimensional arrays where addition, subtraction, multiplication, and a norm indicating a size of an element are defined, and for an ideal of the ring R, elements f and g of the ring R and an element Fq that is an inverse of f(mod q), and (ii) generating, as the public key, an element h that is congruent to a product of the element g and the element Fq mod q; and
- a private key generation step of (i) generating a plurality of solutions $(F, G)=(F\_1, G\_1), (F\_2, G\_2), \ldots$, and $(F\_u, G\_u)$, each of which is a pair of elements of the ring R, satisfies $f \times G - g \times F = q$, and has a norm that is smaller than a predetermined value, u being a positive integer that is larger than 1, and (ii) generating, as the plurality of private keys, a plurality of four-element sets $(f, g, F\_1, G\_1), (f, g, F\_2, G\_2), \ldots$, and $(f, g, F\_u, G\_u)$, each of which is a different one of the plurality of private keys, wherein the public key generation unit generates the public key in the public key generation step, and wherein the private key generation unit generates the plurality of private keys in the private key generation step.

* * * * *

UNITED STATES PATENT AND TRADEMARK OFFICE
CERTIFICATE OF CORRECTION

PATENT NO. : 7,664,260 B2
APPLICATION NO. : 11/795256
DATED : February 16, 2010
INVENTOR(S) : Yuichi Futa et al.

It is certified that error appears in the above-identified patent and that said Letters Patent is hereby corrected as shown below:

On the Title Page

In Item No. (86), under section PCT No.:, "PCT/JP2006/000508" should read
-- PCT/JP2006/300508 --

In the Specification

In column 7, line 12, "(f, g, $F\_2$, $G\_2$), and" should read -- (f, g, $F\_2$, $G\_2$), ..., and --
In column 8, line 47, "(f, g, $F\_2$, $G\_2$), and" should read -- (f, g, $F\_2$, $G\_2$), ..., and --
In column 29, line 2, "($F\_2$, $G\_2$), and" should read -- ($F\_2$, $G\_2$), ..., and --

In the Claims

In column 30, claim 1, line 49, "(f, g, $F\_2$, $G\_2$), and" should read -- (f, g, $F\_2$, $G\_2$), ..., and --
In column 34, claim 10, line 11, "(f, g, $F\_2$, $G\_2$), and" should read -- (f, g, $F\_2$, $G\_2$), ..., and --
In column 36, claim 13, line 15, "(f, g, $F\_2$, $G\_2$), and" should read -- (f, g, $F\_2$, $G\_2$), ..., and --

Signed and Sealed this

Third Day of August, 2010

David J. Kappos
*Director of the United States Patent and Trademark Office*